US012725040B2

(12) United States Patent
Okamura et al.

(10) Patent No.: US 12,725,040 B2

(45) Date of Patent: Sep. 1, 2026

(54) DATA PROCESSING METHOD AND LEARNING METHOD

(71) Applicant: Evident Corporation, Tatsuno-machi (JP)

(72) Inventors: Toshiro Okamura, Hino (JP); Satoshi Watanabe, Hinohara-mura (JP)

(73) Assignee: Evident Corporation, Kamiina-Gun (JP)

( * ) Notice: Subject to any disclaimer, the term of this patent is extended or adjusted under 35 U.S.C. 154(b) by 521 days.

(21) Appl. No.: 18/464,510

(22) Filed: Sep. 11, 2023

(65) Prior Publication Data

US 2023/0419112 A1 Dec. 28, 2023

Related U.S. Application Data

(63) Continuation of application No. PCT/JP2021/010772, filed on Mar. 17, 2021.

(51) Int. Cl.
*G06N 3/08* (2023.01)

(52) U.S. Cl.
CPC .................................... *G06N 3/08* (2013.01)

(58) Field of Classification Search
CPC ........ G01N 21/41; G01N 21/59; G02B 21/36; G06N 3/0464; G06N 3/08; G06N 3/084
See application file for complete search history.

(56) References Cited

U.S. PATENT DOCUMENTS 10,180,387 B2 1/2019 Ozaki et al.
11,222,415 B2 1/2022 Ozcan et al.

(Continued)

FOREIGN PATENT DOCUMENTS

CN 107958475 A 4/2018
KR 20170140473 A 12/2017
WO 2016017533 A1 2/2016

OTHER PUBLICATIONS

International Search Report (ISR) (and an English language translation thereof) dated Jun. 8, 2021, issued in International Application No. PCT/JP2021/010772.

(Continued)

*Primary Examiner* — Boubacar Abdou Tchoussou

(74) *Attorney, Agent, or Firm* — Holtz, Holtz & Volek PC

(57) ABSTRACT

A data processing method includes an input step S1 of inputting measurement data into a neural network, an estimation step S2 of generating estimation data from the measurement data, a restoration step S3 of generating restoration data from the estimation data, and a calculation step S4 of calculating a confidence level of the estimation data, based on the measurement data and the restoration data. The neural network is a trained model, the measurement data is data obtained by measuring light transmitted through an object, the estimation data is data of a three-dimensional optical characteristic of the object estimated from the measurement data, and the three-dimensional optical characteristic is a refractive index distribution or an absorptance distribution. In the estimation, the neural network is used, in the restoration, forward propagation operations are performed on the estimation data, and in the forward propagation operations, wavefronts passing through the interior of the object estimated from the measurement data are sequentially obtained in a direction in which light travels.

16 Claims, 25 Drawing Sheets

(56) References Cited

U.S. PATENT DOCUMENTS

| | | | | |
|---|---|---|---|---|
| 12,002,185 | B2 * | 6/2024 | Zhang | G06N 3/0464 |
| 12,141,897 | B2 * | 11/2024 | Park | G06N 3/08 |
| 2017/0212033 | A1 | 7/2017 | Ozaki et al. | |
| 2018/0137338 | A1 * | 5/2018 | Kraus | G06N 3/084 |
| 2019/0333199 | A1 | 10/2019 | Ozcan et al. | |
| 2025/0069704 | A1 * | 2/2025 | Jaganathan | G06F 16/907 |

OTHER PUBLICATIONS

Written Opinion dated Jun. 8, 2021, issued in International Application No. PCT/JP2021/010772.

Qu, et al., "Inverse design of an integrated-nanophotonics optical neural network", Science Bulletin, Apr. 1, 2020, vol. 65, pp. 1177-1183.

International Preliminary Report on Patentability (IPRP) (and an English language translation thereof) dated Sep. 28, 2023, issued in counterpart International Application No. PCT/JP2021/010772.

* cited by examiner

O(x,z)

4

MODEL DATA
SM(x,z)

BACK PROPAGATION OPERATIONS

FORWARD PROPAGATION OPERATIONS

FIRST COMPARISON DATA
SC1(x,z)

SECOND COMPARISON DATA
SC2(x,z)

DIFFERENCE IS CALCULATED

X
Z

TRAINING INPUT DATA

SECOND COMPARISON DATA

TRAINING OUTPUT DATA

VIRTUAL OBJECT DATA

SC21(x,z)

O'1(x,z)

SC22(x,z)

O'2(x,z)

SC2N(x,z)

O'N(x,z)

| TRAINING INPUT DATA | | TRAINING OUTPUT DATA | | |
|---|---|---|---|---|
| FIRST CORRESPONDING DATA | SECOND CORRESPONDING DATA | True | False | |
| BASIC DATA B | i-TH DEFORMATION DATA bi | 1. 0 | 0. 0 | DATA SET 1 |
| BASIC DATA A | i-TH DEFORMATION DATA di | 0. 0 | 1. 0 | DATA SET 2 |
| BASIC DATA K | i-TH DEFORMATION DATA yi | 0. 0 | 1. 0 | DATA SET 1 |
| BASIC DATA F | i-TH DEFORMATION DATA fi | 1. 0 | 0. 0 | DATA SET 2 |
| ⋮ | ⋮ | ⋮ | | ⋮ |
| BASIC DATA E | i-TH DEFORMATION DATA ei | 1. 0 | 0. 0 | DATA SET 1 |

DATA PROCESSING METHOD AND LEARNING METHOD

CROSS-REFERENCE TO RELATED APPLICATION

The present application is a continuation application of PCT/JP2021/010772 filed on Mar. 17, 2021; the entire contents of which are incorporated herein by reference.

TECHNICAL FIELD

Background

The present disclosure relates to a data processing method and a learning method.

Description of the Related Art

A microscope using a deep neural network is disclosed in United States Patent Application Publication No. 2019/0333199. In this microscope, learning is performed using high-resolution images and low-resolution images. Since a trained deep neural network is used, it is possible to output an image with improved image quality at high speed. The image quality is, for example, spatial resolution, depth of field, SN ratio, and contrast.

SUMMARY

A data processing method according to at least some embodiments of the present disclosure includes:

an input step of inputting measurement data into a neural network;

an estimation step of generating estimation data from the measurement data;

a restoration step of generating restoration data from the estimation data; and a calculation step of calculating a confidence level of the estimation data, based on the measurement data and the restoration data, wherein the neural network is a trained model, the measurement data is data obtained by measuring light transmitted through an object, the estimation data is data of a three-dimensional optical characteristic of the object estimated from the measurement data, the three-dimensional optical characteristic is a refractive index distribution or an absorptance distribution, in the estimation, the neural network is used, in the restoration, forward propagation operations are performed on the estimation data, and in the forward propagation operations, wavefronts passing through interior of the object estimated from the measurement data are sequentially obtained in a direction in which light travels.

Further, a data processing method according to at least some embodiments of the present disclosure includes:

an input step of inputting measurement data into a neural network;

an estimation step of generating estimation data from the measurement data;

a restoration step of generating restoration data from the estimation data;

a calculation step of calculating a confidence level of the estimation data, based on the measurement data and the restoration data; and a learning step of learning by the neural network with a quantity inversely proportional to the confidence level as a loss, wherein the measurement data is data obtained by measuring light transmitted through an object, the estimation data is data of a three-dimensional optical characteristic of the object estimated from the measurement data, the three-dimensional optical characteristic is a refractive index distribution or an absorptance distribution, in the estimation, the neural network is used, in the restoration, forward propagation operations are performed on the estimation data, and in the forward propagation operations, wavefronts passing through interior of the object estimated from the measurement data are sequentially obtained in a direction in which light travels.

Further, a learning method for a neural network according to at least some embodiments of the present disclosure is a learning method for a neural network to calculate a confidence level of estimation data, wherein the confidence level of the estimation data is calculated based on measurement data and restoration data, the measurement data is data obtained by measuring light transmitted through an object, the estimation data is data of a three-dimensional optical characteristic of the object estimated from the measurement data, the three-dimensional optical characteristic is a refractive index distribution or an absorptance distribution, the restoration data is data generated by performing forward propagation operations on the estimation data, in the forward propagation operations, wavefronts passing through interior of the object estimated from the measurement data are sequentially obtained in a direction in which light travels, the learning method includes:

a first learning step of learning using a first training data set; and a second learning step of learning using a second training data set, the first learning step and the second learning step are repeatedly performed, the first training data set includes first data, first corrected data, and teaching data indicating true between true and false, the second training data set includes the first data, second corrected data, and the teaching data indicating false between true and false, the first corrected data is data obtained by performing a correction process on the first data, the second corrected data is data obtained by performing a correction process on second data, the second data is different from the first data, and the first data and the second data are data obtained by measuring light transmitted through the object, or data generated by performing forward propagation operations on an object model that models a three-dimensional optical characteristic of the object.

DETAILED DESCRIPTION

In a deep neural network, a result with low estimation accuracy may be output in some cases. For example, in estimation of three-dimensional optical characteristics of an object, the estimated three-dimensional optical characteristics may differ greatly from the three-dimensional optical characteristics of the actual object. It is therefore difficult to determine whether the estimation result is reliable.

Prior to a description of examples, operation effects of embodiments according to some aspects of the present disclosure will be described. In a specific description of operation effects of the embodiments, specific examples will be described. However, the examples described later as well as the illustrative embodiments are only some of the embodiments encompassed by the present disclosure, and the embodiments include numerous variations. Therefore, the present disclosure is not intended to be limited to the illustrative embodiments.

When an object is small, it is difficult to directly determine the three-dimensional optical characteristics of the object. In this case, it is possible to determine the three-dimensional optical characteristics, for example, by estimation. In a data processing method of the present embodiment, a three-dimensional optical characteristic of an object is estimated using a neural network. The three-dimensional optical characteristic is a refractive index distribution or an absorptance distribution.

In the following, a case where a deep neural network (hereinafter referred to as "DNN") is used as a neural network will be described. A neural network includes an input layer, an output layer, and one hidden layer. On the other hand, a DNN includes an input layer, an output layer, and a plurality of hidden layers.

When an object is small, an optical image of the object can be obtained using an optical system. The optical image of the object reflects three-dimensional optical characteristics. It is desirable if the optical image of the object is a magnified image. With a magnified image, it is possible to easily obtain data necessary for estimating three-dimensional optical characteristics from a picked-up image.

Figure 1A:
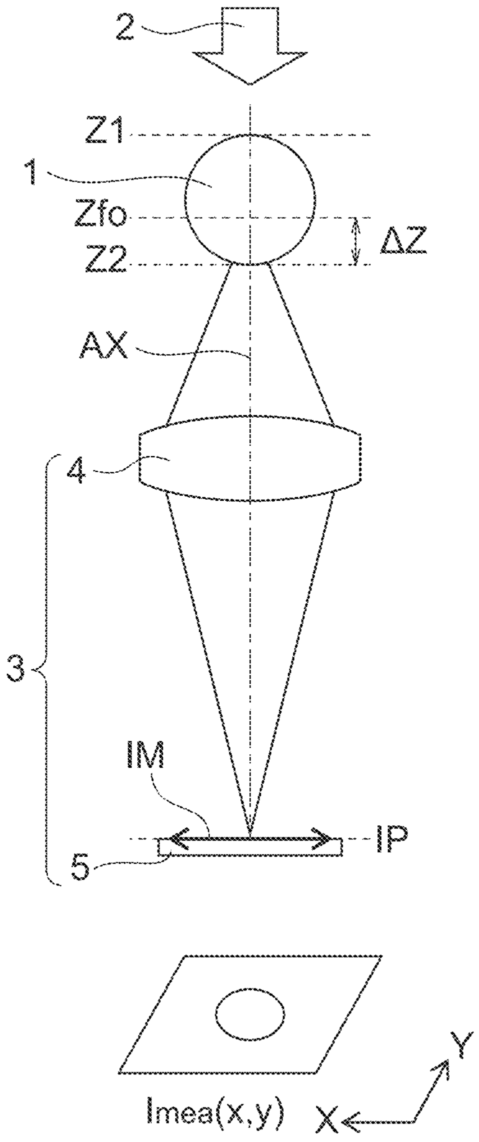
FIGS. 1A, 1B, and 1C are diagrams illustrating a manner of acquiring an image of an optical image of an object.
Figure 1B:
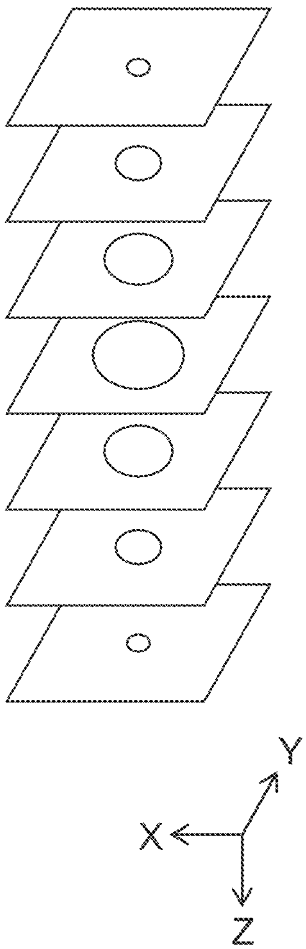
Figure 1C:
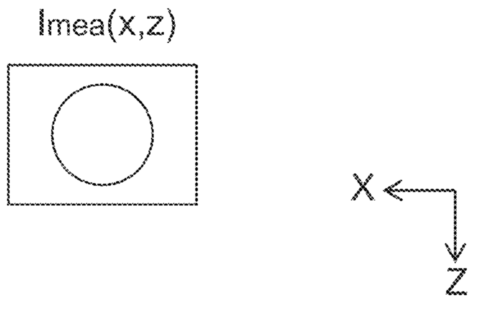

FIGS. 1A, 1B, and 1C are diagrams illustrating a manner of acquiring an image of an optical image of an object. FIG. 1A is a diagram illustrating a specific example of the method of acquiring an image. FIG. 1B is a diagram illustrating a plurality of images in XY cross section. FIG. 1C is a diagram illustrating an image in XZ cross section. For ease of explanation, the object is depicted large.

The Z axis is an axis parallel to the optical axis AX. The X axis is an axis orthogonal to the optical axis AX. The Y axis is an axis orthogonal to the X axis and the Z axis.

As illustrated in FIG. 1A, an object 1 is irradiated with illumination light 2. The object 1 is illuminated by illumination light 2. Light transmitted through the object 1 is incident on an image pickup unit 3. The image pickup unit 3 includes an optical system 4 and an image pickup element 5.

In the optical system 4, an optical image IM is formed on an imaging plane IP. The optical image IM is a magnified image of the object 1. The position of the imaging plane IP is conjugate to a position Zfo. Therefore, the optical image IM is an optical image of the object 1 at the position Zfo. The position Zfo is a focus position of the optical system 4.

An image pickup surface of the image pickup element 5 is located at the imaging plane IP. By picking up the optical image IM with the image pickup element 5, it is possible to acquire an image Imea(x,y). The image Imea(x,y) is an image of the optical image IM and is an image in XY cross section.

The thickness of the object 1 is large. In order to acquire an image of the optical image of the object 1 for the entire object 1, it is desirable to acquire the image Imea(x,y) while moving the position Zfo between a position Z1 and a position Z2. As a result, as illustrated in FIG. 1B, it is possible to acquire a plurality of images Imea(x,y).

In acquisition of a plurality of images Imea(x,y), the object 1 and the image pickup unit 3 may be moved relative to each other in the Z axis direction. In moving the object 1, the object 1 may be held by a stage and the stage may be moved in the Z axis direction. Alternatively, the optical system 4 may be formed with an infinity-corrected objective lens and an imaging lens, and only the infinity-corrected objective lens may be moved in the Z axis direction.

Data necessary for estimating a three-dimensional optical characteristic can be obtained from a plurality of images Imea(x,y). Further, as illustrated in FIG. 1C, it is possible to obtain an image Imea(x,z) in XZ cross section from a plurality of images Imea(x,y).

A data processing method of the present embodiment will be described using a data processing method of a first embodiment and a data processing method of a second embodiment.

The data processing method of the first embodiment includes an input step of inputting measurement data into a neural network, an estimation step of generating estimation data from the measurement data, a restoration step of generating restoration data from the estimation data, and a calculation step of calculating a confidence level of the estimation data, based on the measurement data and the restoration data.

The neural network is a trained model, the measurement data is data obtained by measuring light transmitted through an object, the estimation data is data of a three-dimensional optical characteristic of the object estimated from the measurement data, and the three-dimensional optical characteristic is a refractive index distribution or an absorptance distribution.

In the estimation, the neural network is used, in the restoration, forward propagation operations are performed on the estimation data, and in the forward propagation operations, wavefronts passing through the interior of the object estimated from the measurement data are sequentially obtained in a direction in which light travels.

Figure 2:
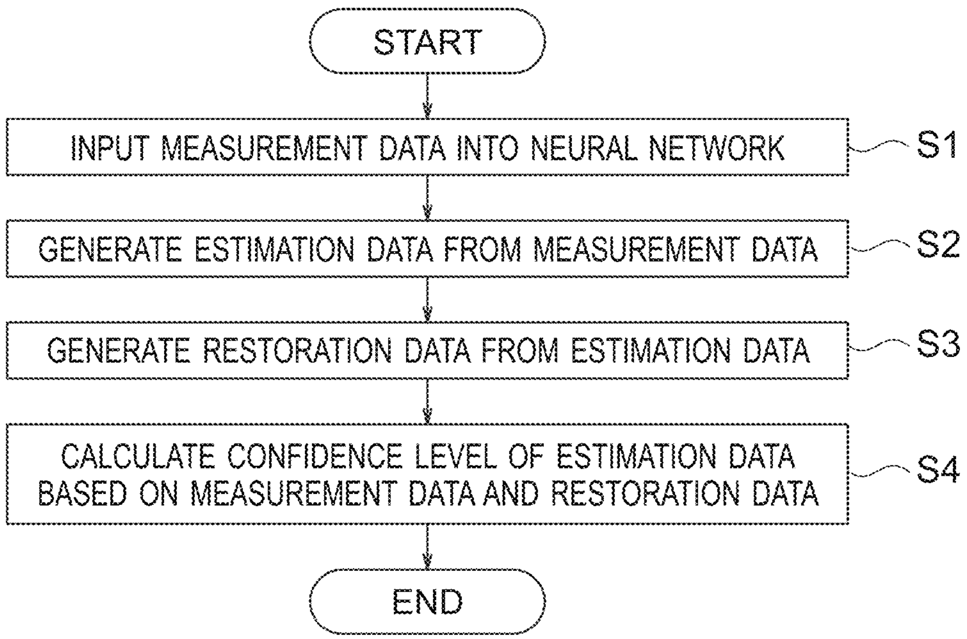
FIG. 2 is a flowchart of a data processing method of a first embodiment.
Figure 3:
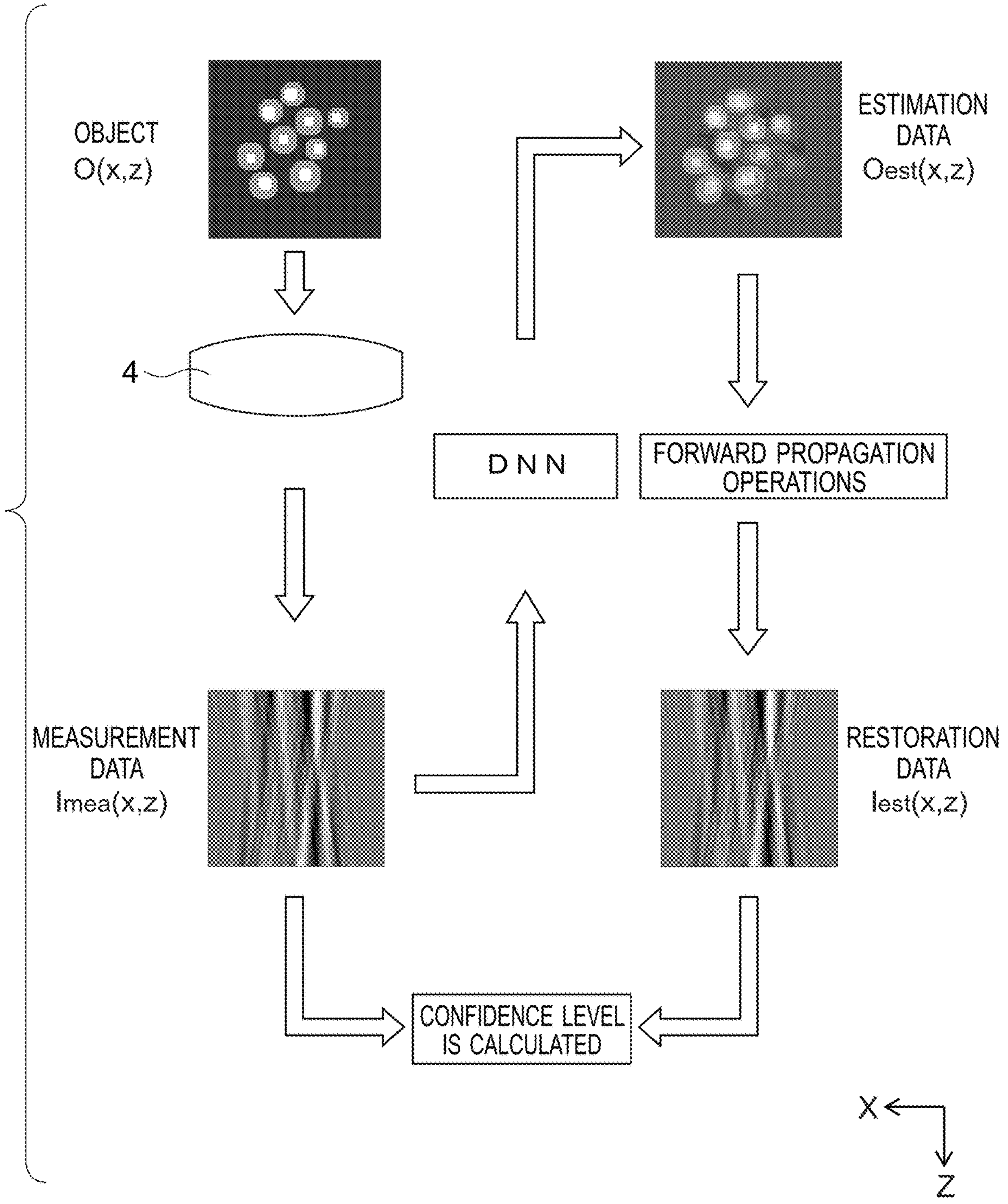
FIG. 3 is a diagram illustrating the data processing method of the first embodiment.

FIG. 2 is a flowchart of the data processing method of the first embodiment. FIG. 3 is a diagram illustrating the data processing method of the first embodiment. The images illustrated in FIG. 3 are images in XZ cross section. In FIG. 3, the object is illustrated by an image O(x,z) for the sake of visibility. A description will be given with reference to FIG. 2 and FIG. 3.

The data processing method of the first embodiment includes step S1, step S2, step S3, and step S4.

Step S1 is an input step. At step S1, measurement data is input into a neural network. The measurement data is data necessary for estimating a three-dimensional optical characteristic and is obtained by measuring light transmitted through an object. An optical image of the object is formed by light transmitted through the object. Therefore, it is possible to obtain measurement data from an image of the optical image of the object.

As illustrated in FIG. 3, an optical image of an object is formed by the optical system 4. An image of the optical image of the object can be obtained by picking up the optical image of the object. Measurement data can be obtained from the image of the optical image of the object. The image Imea(x,z) is an image representing the measurement data.

In the data processing method of the first embodiment, a neural network is used. This neural network is a trained model. The trained model is a trained neural network. The DNN is also a trained DNN.

Parameters such as weights and biases are used in the neural network. In the trained model, trained parameters are used. Since optimum parameters are set, accurate estimation can be performed.

As described above, at step S1, measurement data is input into a neural network. In FIG. 3, measurement data is input into a DNN. When step S1 is finished, step S2 is executed.

Step S2 is an estimation step. At step S2, estimation data is generated from the measurement data. The estimation data is data of a three-dimensional optical characteristic of the object estimated from the measurement data.

When the thickness of the object is large, an optical image of the object is formed by light from a focus position and light from a non-focus position. A clear optical image is formed with light from a focus position, whereas a clear optical image is not formed with light from a non-focus position. Since the optical image that is not clear is superimposed on the clear optical image, a clear optical image is not formed. As a result, it is impossible to acquire a clear image.

The thickness of the object illustrated in FIG. 3 is as thick as the object 1 illustrated in FIG. 1A. The optical image of the object is therefore not clear. Since the optical image is not clear, the image Imea(x,z) is also not clear.

As illustrated in FIG. 3, the measured image Imea(x,z) differs greatly from an image O(x,z) of the object measured. It is difficult for an observer to infer the image O(x,z) by viewing the image Imea(x,z).

As illustrated in FIG. 3, the estimation data is calculated from the measurement data by the DNN. An image Oest(x,z) is an image representing the estimation data. By viewing the image Oest(x,z), the observer can infer the image O(x,z) of the object observed.

An image estimated by the DNN is greatly affected by training data. When training data does not include an image O(x,z) close to the object observed and a corresponding image Imea(x,z), it is impossible to generate an accurate estimation data Oest(x,z). There is a high possibility that the generated estimation data Oest(x,z) generates an image close to the image O(x,z) included in the training data. It is not possible to determine whether the image Oest(x,z) of the generated estimation data represents the image O(x,z) of the object observed.

Step S3 is a restoration step. At step S3, restoration data is generated from the estimation data. In the restoration, forward propagation operations are performed on the estimation data. In the forward propagation operations, wavefronts passing through the interior of the object estimated are sequentially obtained in a direction in which light travels.

The measurement data is obtained from an image of the optical image of the object. The estimation data is data of a three-dimensional optical characteristic of the object estimated. Therefore, if the optical image can be calculated from the estimation data, data similar to the measurement data (hereinafter referred to as "restoration data") can be obtained.

Assuming that the estimation data is data of an estimation object, the restoration data is data obtained from the optical image of the estimation object (hereinafter referred to as "estimated optical image"). The measurement data is data obtained from an image of the optical image of the object. Since both the measurement data and the restoration data are data obtained from the optical image, it is possible to compare the measurement data with the restoration data. By comparing the measurement data with the restoration data, it is possible to determine whether the estimation data correctly represents the three-dimensional optical characteristic of the object.

Forward propagation operations are performed in order to obtain the restoration data from the estimation data. In forward propagation operations, various kinds of operations are performed. It is possible to calculate a wavefront passing through the interior of the object, for example, by the beam propagation method. In the beam propagation method, the estimation object is replaced by a plurality of thin layers. Then, a wavefront change as light passes through each layer is calculated sequentially.

Figure 4A:
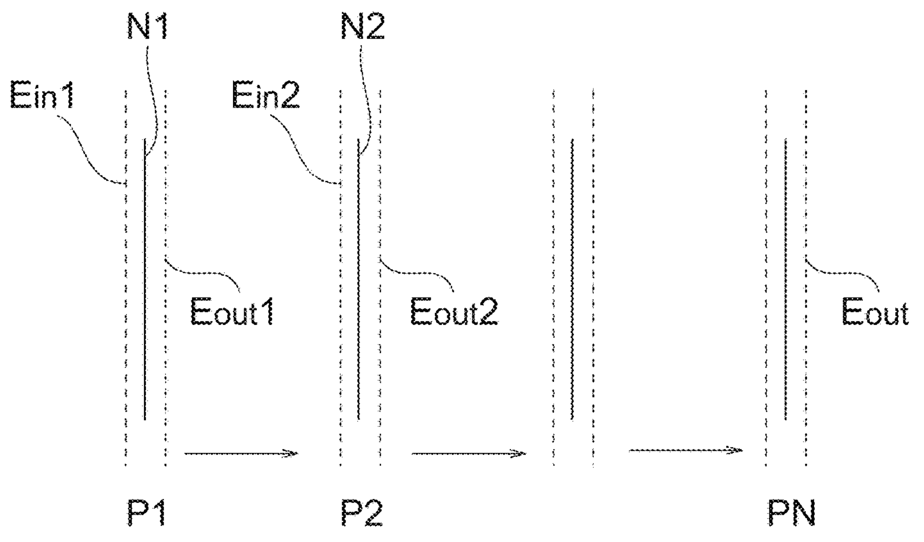
FIGS. 4A and 4B are diagrams for explaining forward propagation operations.
Figure 4B:
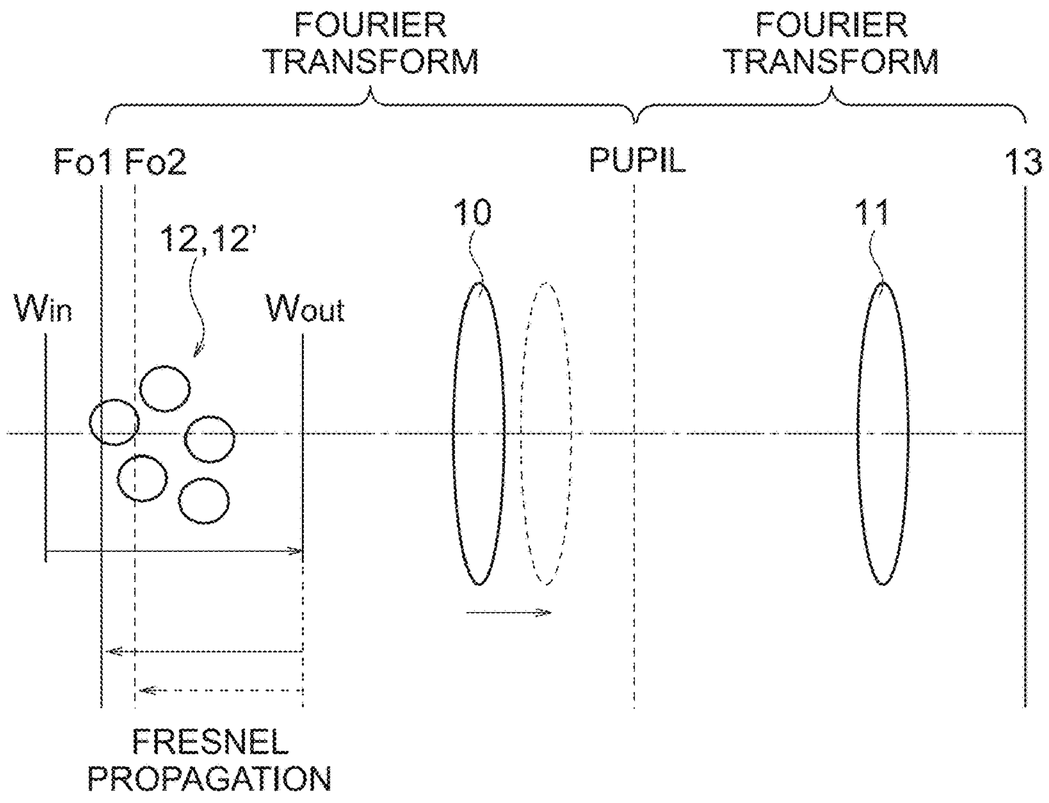

FIGS. 4A and 4B are diagrams for explaining forward propagation operations. FIG. 4A is a diagram for explaining the beam propagation method. FIG. 4B is a diagram for explaining a process in forward propagation operations.

Wavefront propagation is Fresnel propagation. In the explanation, the wavefront is replaced by an electric field. In FIG. 4A, a solid line represents the complex refractive index of an object. A dotted line represents an electric field (scalar field of light). An arrow represents Fresnel propagation. The beam propagation method is a method that repeatedly computes Fresnel propagation between thin layers.

The beam propagation method will be described. At a position P1, an electric field Eout1 on the emission side is obtained using an electric field Ein1 on the incident side and a complex refractive index N1.

An electric field Ein2 on the incident side at a position P2 is obtained from the electric field Eout1. The propagation from the electric field Eout1 to the electric field Ein2 is Fresnel propagation. It is possible to obtain an electric field Eout2 on the emission side using the electric field Ein2 and a complex refractive index N2. The propagation in which Fresnel propagation is repeated while reflecting the complex refractive index of the object in this way is the beam propagation.

In this way, it is possible to calculate the electric field on the emission side from the electric field on the incident side, using the beam propagation method. As a result, it is possible to obtain an electric field Eout on the emission side at a position PN. When the position of the wavefront emitted from the estimation object is the position PN, the electric field Eout represents the wavefront emitted from the estimation object.

Forward propagation operations will be described. In forward propagation operations, an estimation optical image is obtained from an estimation object. The estimation optical image corresponds to an optical image of the object. At the time of measurement, an imaging optical system is used as illustrated in FIG. 4B. It is possible to obtain the image Imea(x,z) of the measurement data by measuring the intensity distribution of electric field at an imaging position 13 of an imaging lens 11 while scanning an objective lens 10 in the optical axis direction.

Since the estimation object Oest(x,z) of the object O(x,z) observed has been acquired, it is possible to obtain an emission wavefront Wout propagating through the object, from the estimation object Oest(x,z) and an incident wavefront Win by the beam propagation method, if the incident wavefront Win is known. From the emission wavefront Wout, it is possible to obtain the electric field at each focus position Fo1, Fo2 when the objective lens 10 is scanned in the optical axis direction, with Fresnel propagation. The intensity distribution of these electric fields corresponds to the image Imea(x,z) of the measurement data if the aberration of the objective lens 10 and the imaging lens 11 is small. An image Iest(x,z) of the intensity distribution obtained by such forward propagation operations is an image representing the restoration data.

When step S3 is finished, step S4 is executed.

Step S4 is a calculation step. At step S4, the confidence level of the estimation data is calculated based on the measurement data and the restoration data.

As described above, since both the measurement data and the restoration data are data obtained from an optical image, it is possible to compare the measurement data with the restoration data. By comparing the measurement data with the restoration data, it is possible to determine whether the estimation data correctly represents the three-dimensional optical characteristic of the object.

For example, when an object with a shape not present in training data is measured, the measured optical image is also an image not present in the training data. However, there is a high possibility that an estimation image of the object generated by the DNN from this optical image resembles an estimation image of the object included in the training data.

Therefore, the optical image serving as the restoration data obtained by forward propagation operations using the estimation image of the object estimated is also an optical image included in the training data. The measured optical image is not included in the training data, and the optical image of the restoration data is included in the training data. Since the measured optical image is different from the restored optical image, in this case, it is possible to determine that the estimation image of the object generated by the DNN does not correctly represent the three-dimensional optical characteristic of the measured object.

The smaller the deviation of the restoration data from the measurement data is, the closer the estimated three-dimensional optical characteristic is to the three-dimensional optical characteristic of the object. For example, assuming that the magnitude of deviation of the restoration data from the measurement data is the confidence level, it is possible to calculate the confidence level of the estimation data, based on the measurement data and the restoration data.

In the data processing method of the first embodiment, the three-dimensional optical characteristic of the object is calculated using a trained model. Thus, it is possible to calculate the three-dimensional optical characteristic of the object in a short time. Furthermore, the confidence level is calculated for the calculated three-dimensional optical characteristic of the object. Thus, it is possible to determine whether the estimated three-dimensional optical characteristic correctly represents the three-dimensional optical characteristic of the object, based on the confidence level.

In order to use a trained model, it is necessary to perform learning in advance in a neural network. Training data is required to perform learning. A method of creating training data will be described. The training data includes training input data and training output data.

(First Creation Method)

Figure 5A:
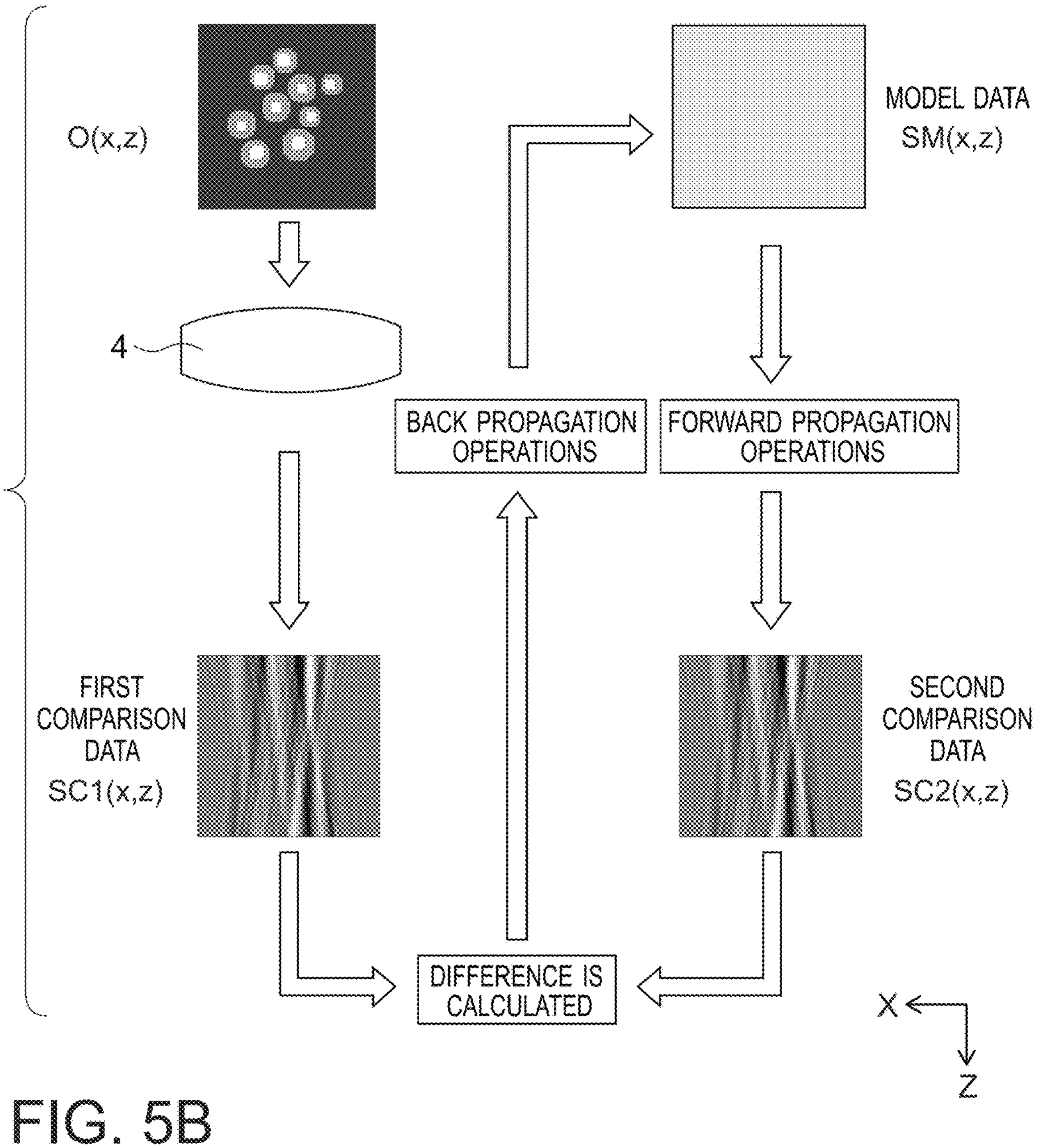
FIGS. 5A and 5B are diagrams illustrating a first creation method.
Figure 5B:
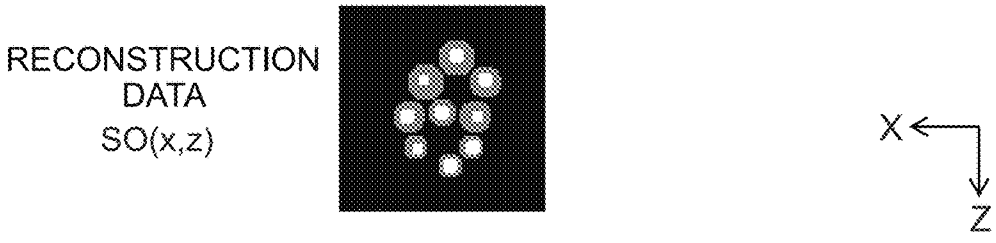

FIGS. 5A and 5B are diagrams illustrating a first creation method. FIG. 5A is a diagram illustrating a process flow in the first creation method. FIG. 5B is a diagram illustrating an image of reconstruction data. The images illustrated in FIGS. 5A and 5B are images in XZ cross section. In FIG. 5A, the object is illustrated by an image O(x,z) for the sake of visibility.

In the first creation method, a reconstruction operation is performed. In the reconstruction operation, reconstruction data is generated from training input data.

As described above, when an object is extremely small, it is difficult to directly acquire the value of a three-dimensional optical characteristic of the object (hereinafter referred to as "optical characteristic value"). Then, an optical image of the object is formed by the optical system 4. First comparison data is obtained from the optical image. An image SC1($x,z$) represents an image of the first comparison data. It is possible to use the first comparison data as training input data. The image SC1($x,z$) represents an image of the training input data.

An object model is used in the reconstruction operation. Since the optical characteristic value is unknown, a value in data of the object model (hereinafter referred to as "model data") is an estimate value.

At the start of the reconstruction operation, an initial value is set for the estimate value. Any value may be used for the estimate value. An image SM(x,z) represents an image of the model data when an initial value is set for the estimate value.

In the reconstruction operation, forward propagation operations are performed using the model data. An optical image of the object model is obtained by forward propagation operations. Second comparison data is obtained from the optical image of the object model. An image SC2($x,z$) represents an image of the second comparison data.

When the first comparison data and the second comparison data are the same, the optical image of the object and the optical image of the object model are the same. In this case, the estimate value is the same as the optical characteristic value. When the first comparison data and the second comparison data are different, the optical image of the object and the optical image of the object model are different. In this case, the estimate value is different from the optical characteristic value.

When the first comparison data and the second comparison data are different, the wavefront that forms the optical image of the object model ("estimation wavefront") is different from the wavefront that forms the optical image of the object. Then, for example, the estimation wavefront is corrected using the difference between the first comparison data and the second comparison data.

Back propagation operations are performed using the corrected estimation wavefront. A new estimate value is obtained by back propagation operations. The value of the model data is replaced by the new estimate value. In other words, the estimate value is updated.

Forward propagation operations, correction of the estimation wavefront, back propagation operations, and updating of the estimate value are repeated until the difference between the first comparison data and the second comparison data is smaller than a threshold.

The model data when the difference between the first comparison data and the second comparison data is smaller than a threshold is defined as reconstruction data. An image SO(x,z) illustrated in FIG. 5B represents an image of the reconstruction data. It is possible to use the reconstruction data as training output data.

Figure 6:
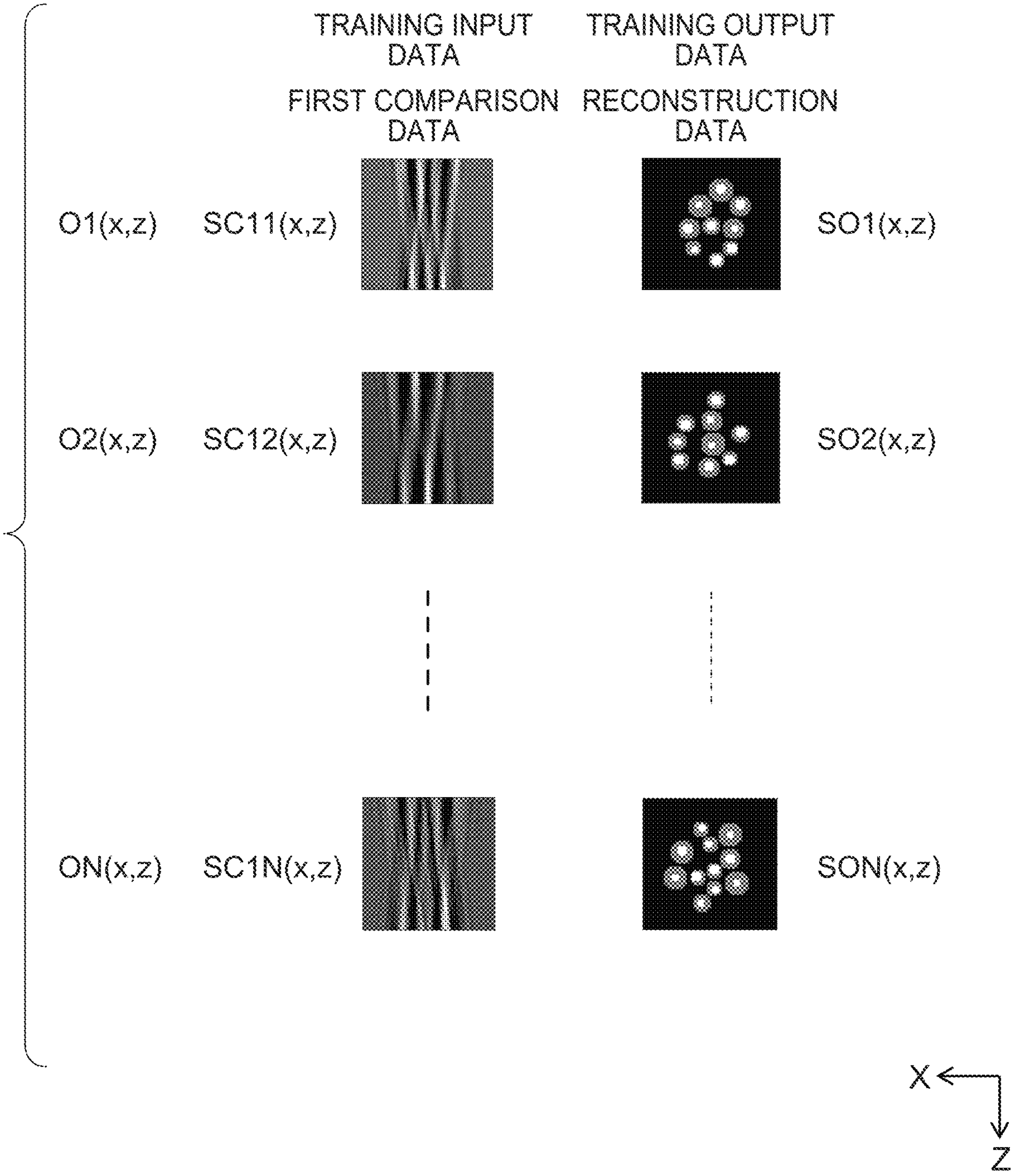
FIG. 6 is a diagram illustrating training data.

FIG. 6 is a diagram illustrating training data. The images illustrated in FIG. 6 are images in XZ cross section.

By performing the reconstruction operation, it is possible to obtain reconstruction data corresponding to the object, that is, training output data. A large amount of training data is needed to perform learning. Therefore, a large number of pieces of training output data is also required. To obtain a large number of pieces of training output data, it is desirable to perform the reconstruction operation for a large number of objects.

Assume that the number of objects is N. FIG. 6 illustrates images of the first comparison data and images of reconstruction data for an object 1, an object 2, and an object N. The object 1, the object 2, and the object N are illuminated at the same illumination angle, for example, 0°.

In FIG. 6, an image of the object is not displayed. O1($x,z$), O2($x,z$) and ON(x,z) are listed to indicate the correspondence between the object and the first comparison data image and the correspondence between the object and the reconstruction data. O1($x,z$) represents the object 1. O2($x,z$) represents the object 2. ON(x,z) represents the object N.

An image SC11($x,z$) represents an image of the first comparison data of the object 1. An image SC12($x,z$) represents an image of the first comparison data of the object 2. An image SC1N(x,z) represents an image of the first comparison data of the object N.

An image SO1($x,z$) represents an image of the reconstruction data of the object 1. An image SO2($x,z$) represents an image of the reconstruction data of the object 2. An image SON(x,z) represents an image of the reconstruction data of the object N.

In the first creation method, the first comparison data is used as training input data, and the reconstruction data is used as training output data. When the number of objects is N, the number of pieces of training input data and the number of pieces of training output data are also N.

In the reconstruction operation, the more the first comparison data in one object is, the more accurate the reconstruction data is. To increase the number of pieces of the first comparison data in one object, for example, it is desirable to illuminate the object at a plurality of illumination angles and obtain the first comparison data from an optical image at each illumination angle.

Figure 7:
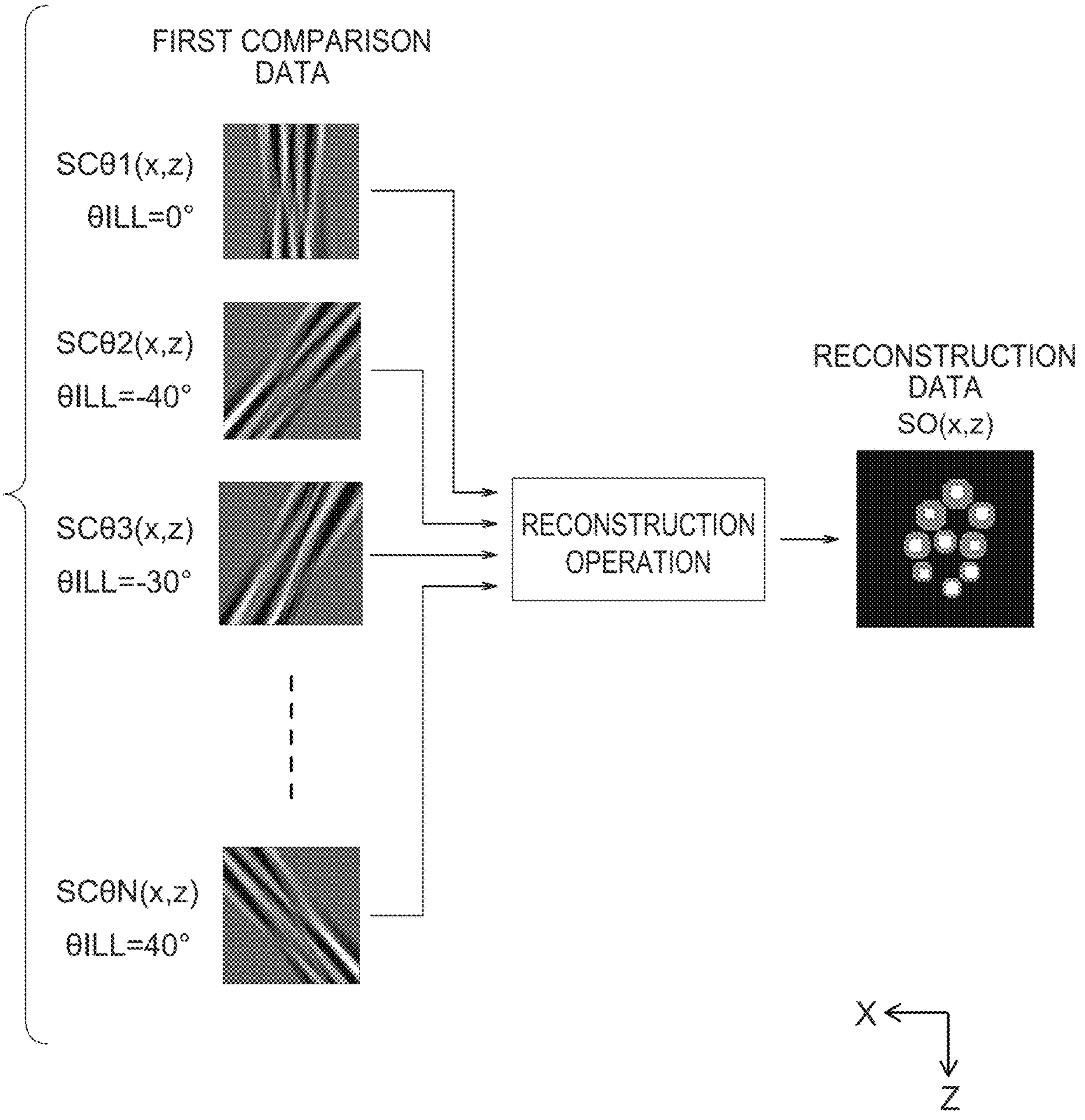
FIG. 7 is a diagram illustrating a method of creating reconstruction data.

FIG. 7 is a diagram illustrating a method of creating reconstruction data. The images illustrated in FIG. 7 are images in XZ cross section.

First comparison data 1 is data obtained from an optical image of the object when the illumination angle θILL is 0°. An image SCθ1($x,z$) represents an image of the first comparison data 1. First comparison data 2 is data obtained from an optical image of the object when the illumination angle θILL is −40°. An image SCθ2($x,z$) represents an image of the first comparison data 2.

First comparison data 3 is data obtained from an optical image of the object when the illumination angle θILL is −30°. An image SCθ3($x,z$) represents an image of the first comparison data 3. First comparison data N is data obtained from an optical image of the object when the illumination angle θILL is 40°. The image SCθN(x,z) represents an image of the first comparison data N.

The illumination angles are different from each other in the first comparison data 1, the first comparison data 2, the first comparison data 3, and the first comparison data N. Therefore, they have information different from each other on the optical characteristic value. It is possible to increase the accuracy of the reconstruction data by using the first comparison data 1, the first comparison data 2, the first comparison data 3, and the first comparison data N in the reconstruction operation.

(Second Creation Method)

Figure 8:
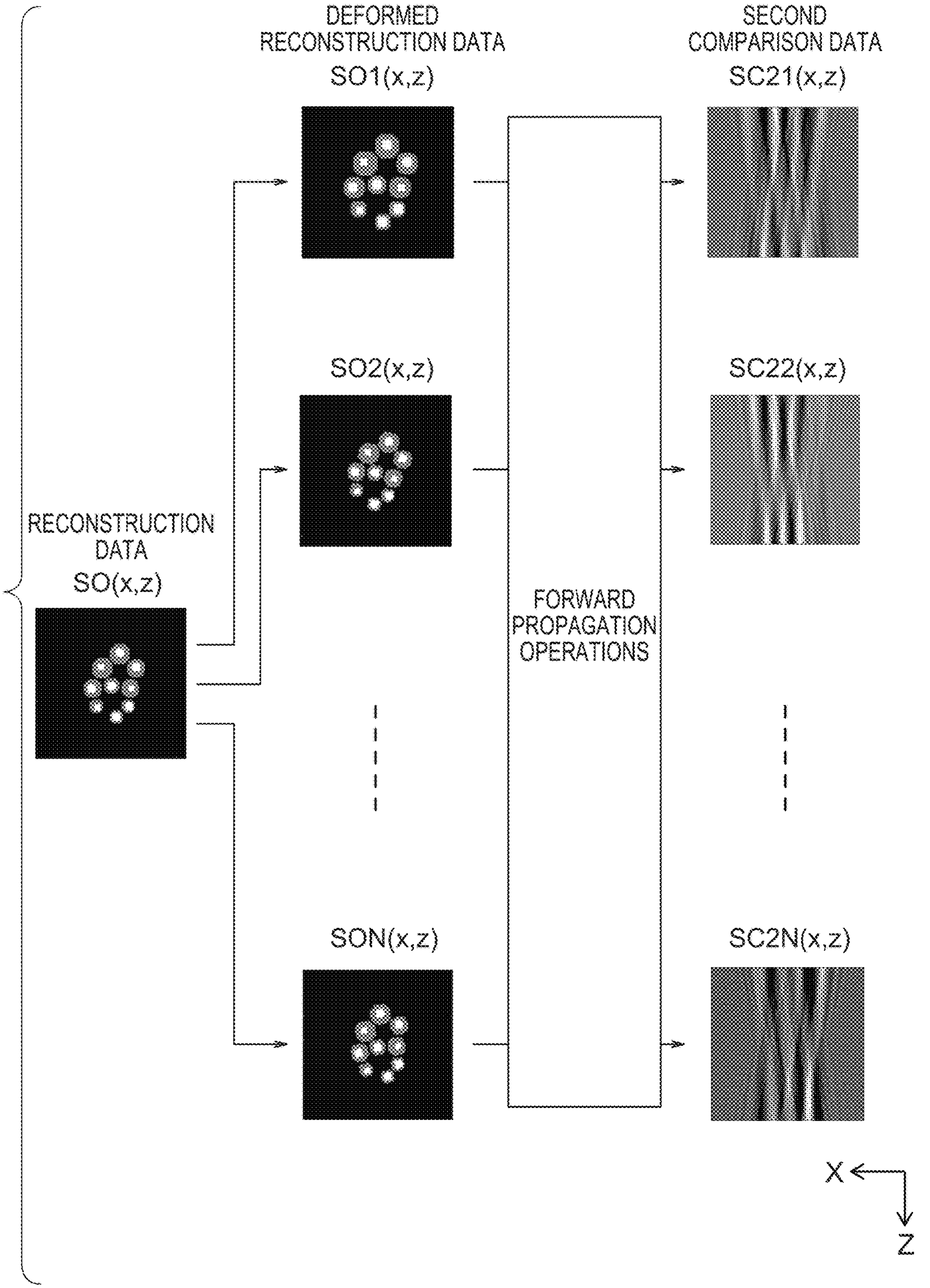
FIG. 8 is a diagram illustrating a second creation method.

FIG. 8 is a diagram illustrating a second creation method. The images illustrated in FIG. 8 are images in XZ cross section.

As explained in FIG. 6, a large number of pieces of training data is needed to perform learning. In the first creation method, forward propagation operations and back propagation operations are repeated to obtain reconstruction data (training output data). Forward propagation operations and back propagation operations take much time. If the time taken to obtain one piece of reconstruction data is long, enormous time is required to obtain a number of pieces of reconstruction data.

In the second creation method, one piece of reconstruction data is deformed. By doing so, it is possible to obtain a number of pieces of reconstruction data, that is, a number of pieces of training output data, in a short time. In deformation of data, for example, enlargement, reduction, rotation, and/or noise addition may be performed.

In learning, training input data paired with training output data is necessary. The training input data is the first comparison data. The first comparison data is obtained from the optical image of the object. However, in the second creation method, the deformed reconstruction data corresponds to the object.

Then, the deformed reconstruction data is regarded as the object, and forward propagation operations are performed using the deformed reconstruction data. By doing so, data corresponding to the optical image of the object can be obtained from the deformed reconstruction data.

In FIG. 5A, the second comparison data is obtained from the model data by performing forward propagation operations. The data corresponding to the optical image of the object corresponds to the second comparison data. In the second creation method, the second comparison data is used as training input data.

The reconstruction data subjected to enlargement is referred to as enlarged reconstruction data. The reconstruction data subjected to reduction is referred to as reduced reconstruction data. The reconstruction data subjected to rotation is referred to as rotated reconstruction data.

An image SO1(*x,z*) represents an image of the enlarged reconstruction data. An image S02(*x,z*) represents an image of the reduced reconstruction data. An image SON(x,z) represents an image of the rotated reconstruction data.

An image SC21(*x,z*) represents an image of the second comparison data obtained from the enlarged reconstruction data. An image SC22(*x,z*) represents an image of the second comparison data obtained from the reduced reconstruction data. An image SC2N(x,z) represents an image of the second comparison data obtained from the rotated reconstruction data.

Figure 9:
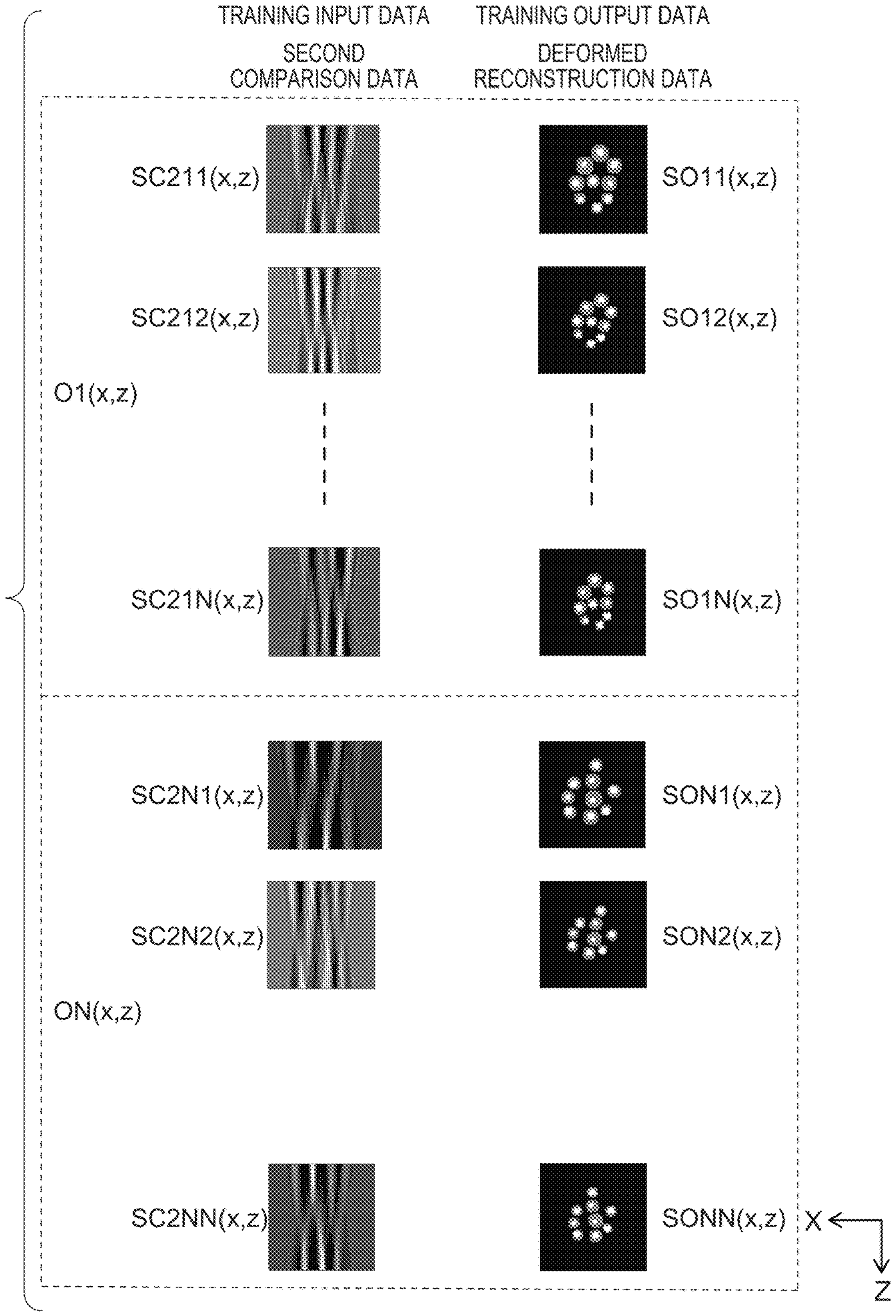
FIG. 9 is a diagram illustrating training data.

FIG. 9 is a diagram illustrating training data. The images illustrated in FIG. 9 are images in XZ cross section.

FIG. 9 illustrates images of the second comparison data and images of the deformed reconstruction data for an object 1 and an object N. The deformed reconstruction data is data obtained by deforming the reconstruction data. All the images will not be described as there are a large number of images.

In FIG. 9, an image of the object is not displayed. O1(*x,z*) and ON(x,z) are listed to indicate the correspondence between the object and the second comparison data image and the correspondence between the object and the deformed reconstruction data. O1(*x,z*) represents the object 1. ON(x,z) represents the object N.

An image SC211(*x,z*) represents an image of the second comparison data obtained from the deformed reconstruction data of the object 1. An image SC21N(x,z) represents an image of the second comparison data obtained from the deformed reconstruction data of the object N.

An image SO11(*x,z*) represents an image of the deformed reconstruction data of the object 1. An image SON1(*x,z*) represents an image of the deformed reconstruction data of the object N.

In the second creation method, the second comparison data is used as training input data, and the deformed reconstruction data is used as training output data. When the number of objects is N, the number of pieces of training input data and the number of pieces of training output data are equal to or greater than N.

(Third Creation Method)

Figure 10:
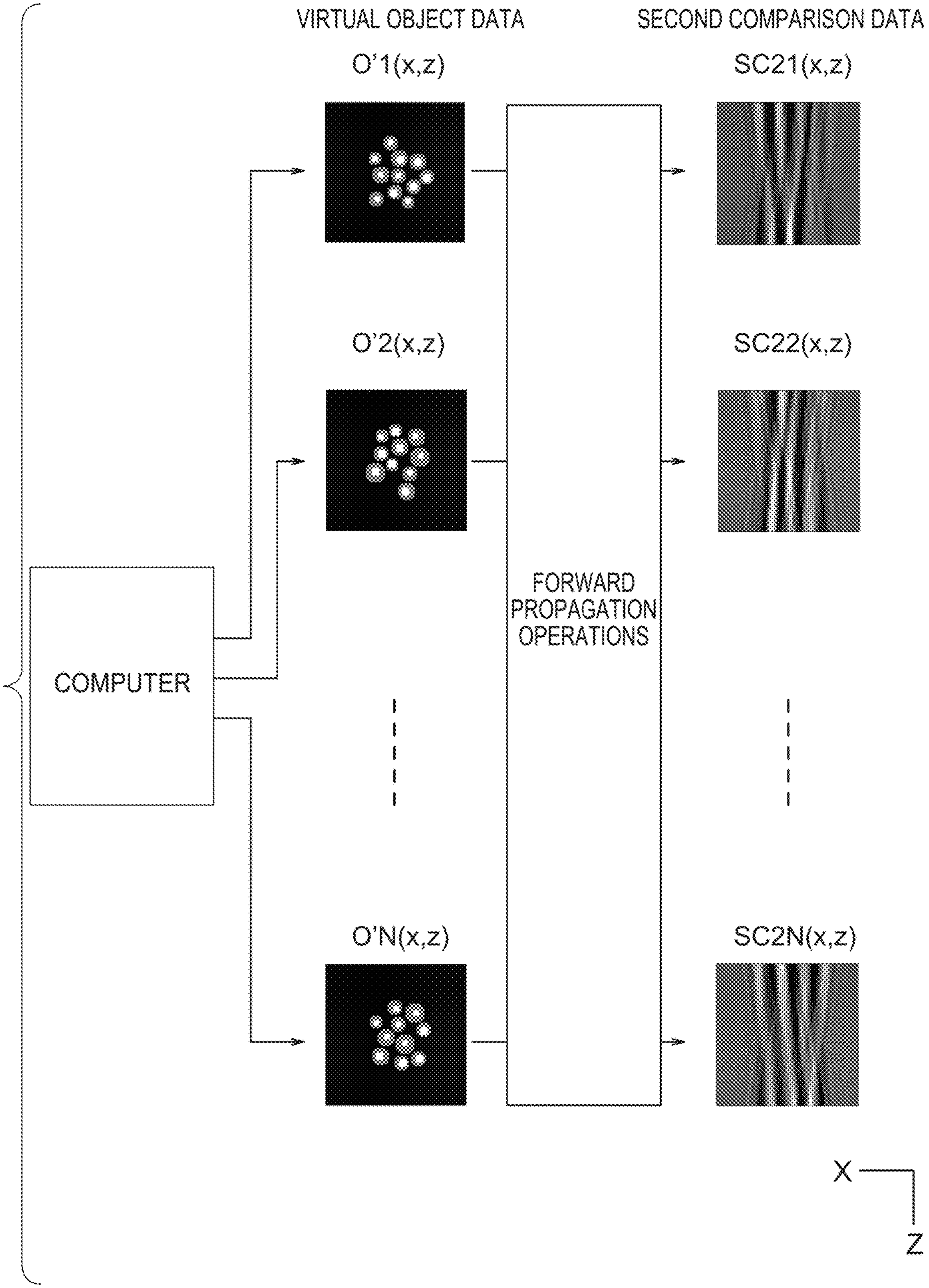
FIG. 10 is a diagram illustrating a third creation method.

FIG. 10 is a diagram illustrating a third creation method. The images illustrated in FIG. 10 are images in XZ cross section.

In the first creation method, first comparison data (training input data) and reconstruction data (training output data) are generated from an object. In the second creation method, reconstruction data is generated from an object, and deformed data (training input data) and second comparison data (training input data) are obtained from the reconstruction data. In this way, an object is used in the first creation method and the second creation method.

On the other hand, in the third creation method, an object is not used. Instead of an object, data generated by a computer (hereinafter referred to as "virtual object data") is used.

The virtual object data corresponds to reconstruction data. Then, forward propagation operations are performed using virtual object data, in the same manner as in the second creation method. By doing so, data corresponding to the optical image of the object can be obtained from the virtual object data.

In FIG. 5A, the second comparison data is obtained from the model data by performing forward propagation operations. The data corresponding to the optical image of the object corresponds to the second comparison data. In the third creation method, the second comparison data is used as training input data.

An image O'1(*x,z*) represents an image of data of a virtual object 1. An image O'2(*x,z*) represents an image of data of a virtual object 2. An image O'N(x,z) represents an image of data of a virtual object N.

The image SC21(*x,z*) represents an image of the second comparison data obtained from data of the virtual object 1. The image SC22(*x,z*) represents an image of the second comparison data obtained from data of the virtual object 2. The image SC2N(x,z) represents an image of the second comparison data obtained from data of the virtual object N.

Figure 11:
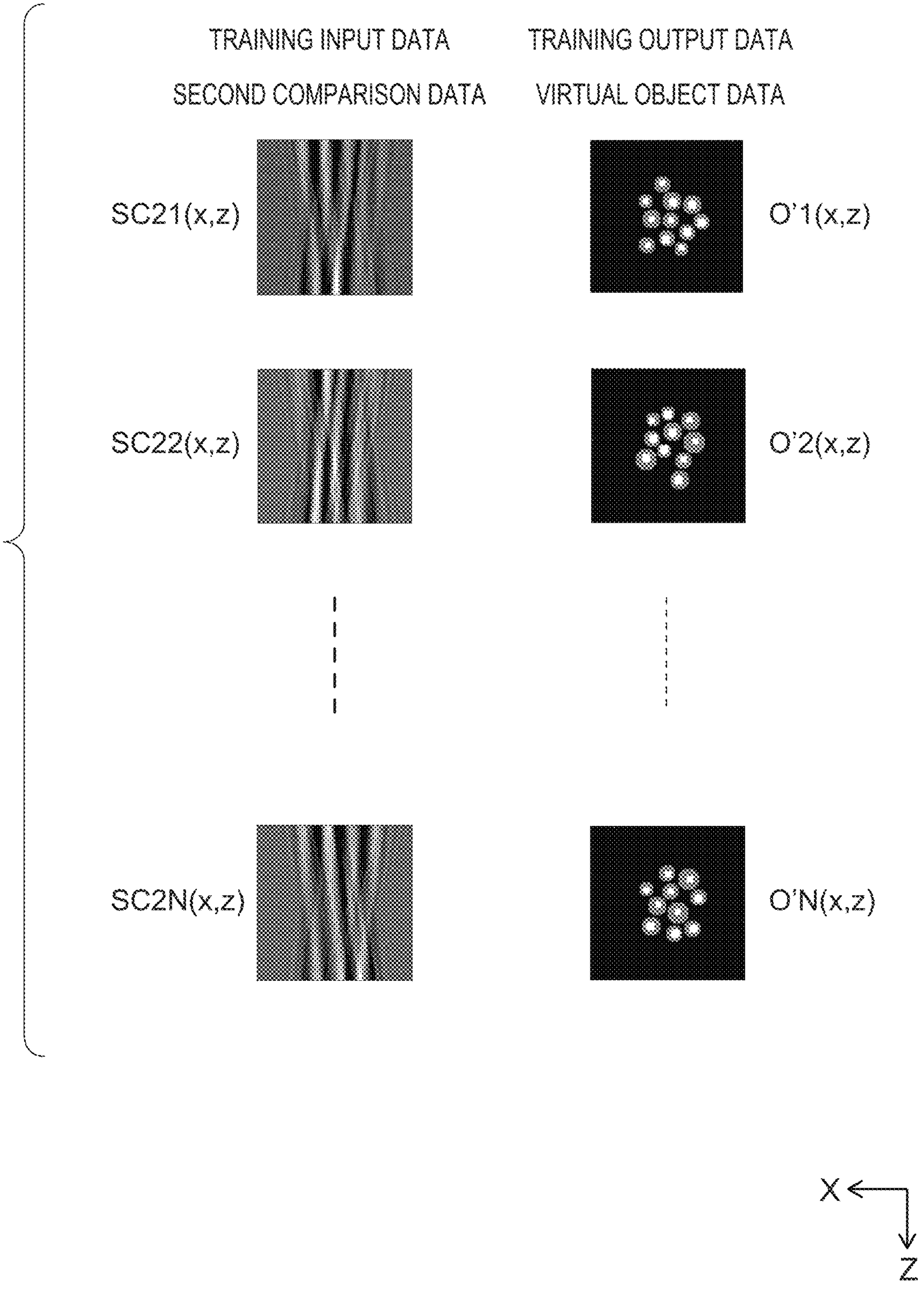
FIG. 11 is a diagram illustrating training data.

FIG. 11 is a diagram illustrating training data. The images illustrated in FIG. 11 are images in XZ cross section.

The image SC21(*x,z*) represents an image of the second comparison data obtained from data of the virtual object 1. The image SC22(*x,z*) represents an image of the second comparison data obtained from data of the virtual object 2. The image SC2N(x,z) represents an image of the second comparison data obtained from data of the virtual object N.

The image O'1(*x,z*) represents an image of data of the virtual object 1. The image O'2(*x,z*) represents an image of data of the virtual object 2. The image O'N(x,z) represents an image of data of the virtual object N.

In the third creation method, the second comparison data is used as training input data, and data of a virtual object is used as training output data. When the number of virtual objects is N, the number of pieces of training input data and the number of pieces of training output data are N. However, virtual objects can be easily created in a short time, and there is no limit to the number of virtual objects that can be created.

(Learning in DNN)

Figure 12:
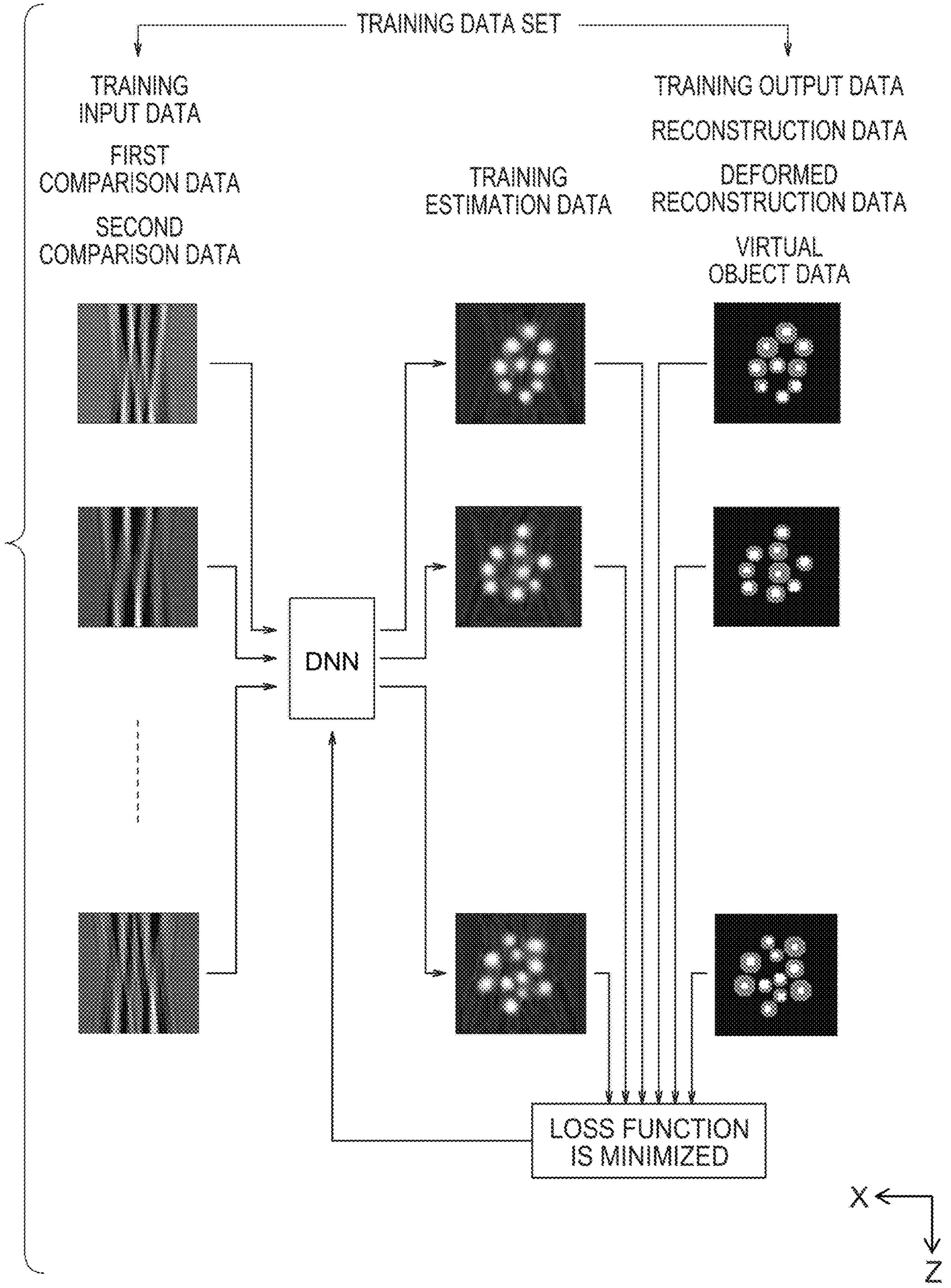
FIG. 12 is a diagram illustrating a manner of learning in a DNN.

FIG. 12 is a diagram illustrating a manner of learning in a DNN. The images illustrated in FIG. 12 are images in XZ cross section.

In learning in a DNN, a training data set is used. The training data set includes training input data and training output data.

The first comparison data in the first creation method, the second comparison data in the second creation method, or the second comparison data in the third creation method is used as the training input data.

The reconstruction data in the first creation method, the deformed reconstruction data in the second creation method, or the virtual object data in the third creation method is used as the training output data.

In learning, training estimation data is output from training input data. A state in which the training estimation data matches the training output data is an ideal state. However, in a state in which learning is insufficient, the training estimation data does not match the training output data. It is possible to represent the difference between the ideal state and the insufficient learning state by a loss function. The insufficient learning state includes a state of not learning.

Various parameters are used in estimation in a DNN. In learning, a loss function is used to search for optimal parameters. In the search for optimal parameters, parameters that minimize the value of the loss function are searched for.

In learning, the comparison between training estimation data and training output data is repeated. Every time the comparison between training estimation data and training output data is performed, the output of the loss function is fed back to the DNN. By repeating comparison between training estimation data and training output data and feedback of the output of the loss function to the DNN, it is possible to obtain optimal parameters.

In the process of outputting training estimation data from training input data, region detection of an image is performed. In the region detection of an image, for example, it is possible to use U-Net.

Figure 13A:
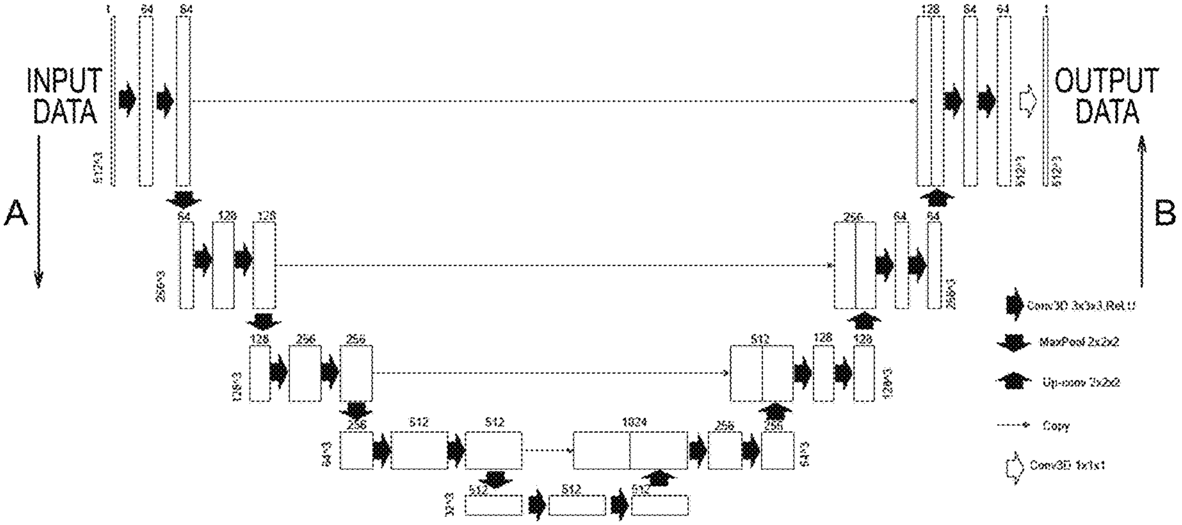
FIGS. 13A and 13B are diagram illustrating U-Net.
Figure 13B:
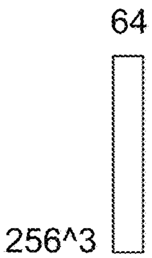

FIGS. 13A and 13B are diagram illustrating U-Net. FIG. 13A is a diagram illustrating a configuration of U-Net. FIG. 13B is a schematic diagram of a data shape. In FIG. 13B, "64" represents the number of channels or the number of feature maps. "256^3" represents the number of pixels.

The process in the direction of arrow A is a process called encoding or downsampling. The process in the direction of arrow B is a process called decoding or upsampling.

In encoding, features of input data are extracted by alternately repeating convolution and pooling. As the process proceeds in the direction of arrow A, regions having features are subdivided. Thus, the number of channels or the number of feature maps increases in exchange for decreasing the number of pixels.

In decoding, output data of the same size as the input data is created by performing deconvolution. The output data is segmented in regions having the same features. Thus, the image in the output data is coarser than the image in the input data.

In encoding, position information of a region having a feature is obtained. Then, in decoding, the position information obtained in encoding is used to create the output data. In FIG. 13A, the passing of position information from encoding to decoding is denoted as "Copy".

The data processing method of the second embodiment includes an input step of inputting measurement data into a neural network, an estimation step of generating estimation data from the measurement data, a restoration step of generating restoration data from the estimation data, a calculation step of calculating a confidence level of the estimation data based on the measurement data and the restoration data, and a learning step of learning by the neural network with a quantity inversely proportional to the confidence level as a loss.

The measurement data is data obtained by measuring light transmitted through an object, the estimation data is data of a three-dimensional optical characteristic of the object estimated from the measurement data, and the three-dimensional optical characteristic is a refractive index distribution or an absorptance distribution.

In the estimation, the neural network is used, in the restoration, forward propagation operations are performed on the estimation data, and in the forward propagation operations, wavefronts passing through the interior of the object estimated from the measurement data are sequentially obtained in a direction in which light travels.

Figure 14:
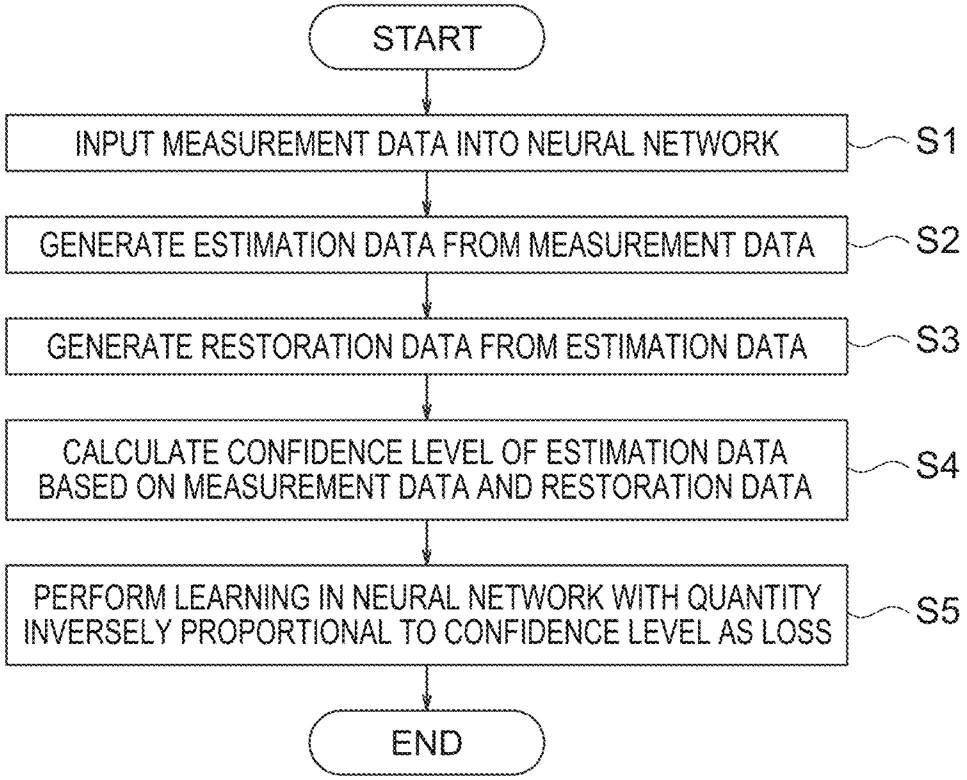
FIG. 14 is a flowchart of a data processing method of a second embodiment.
Figure 15:
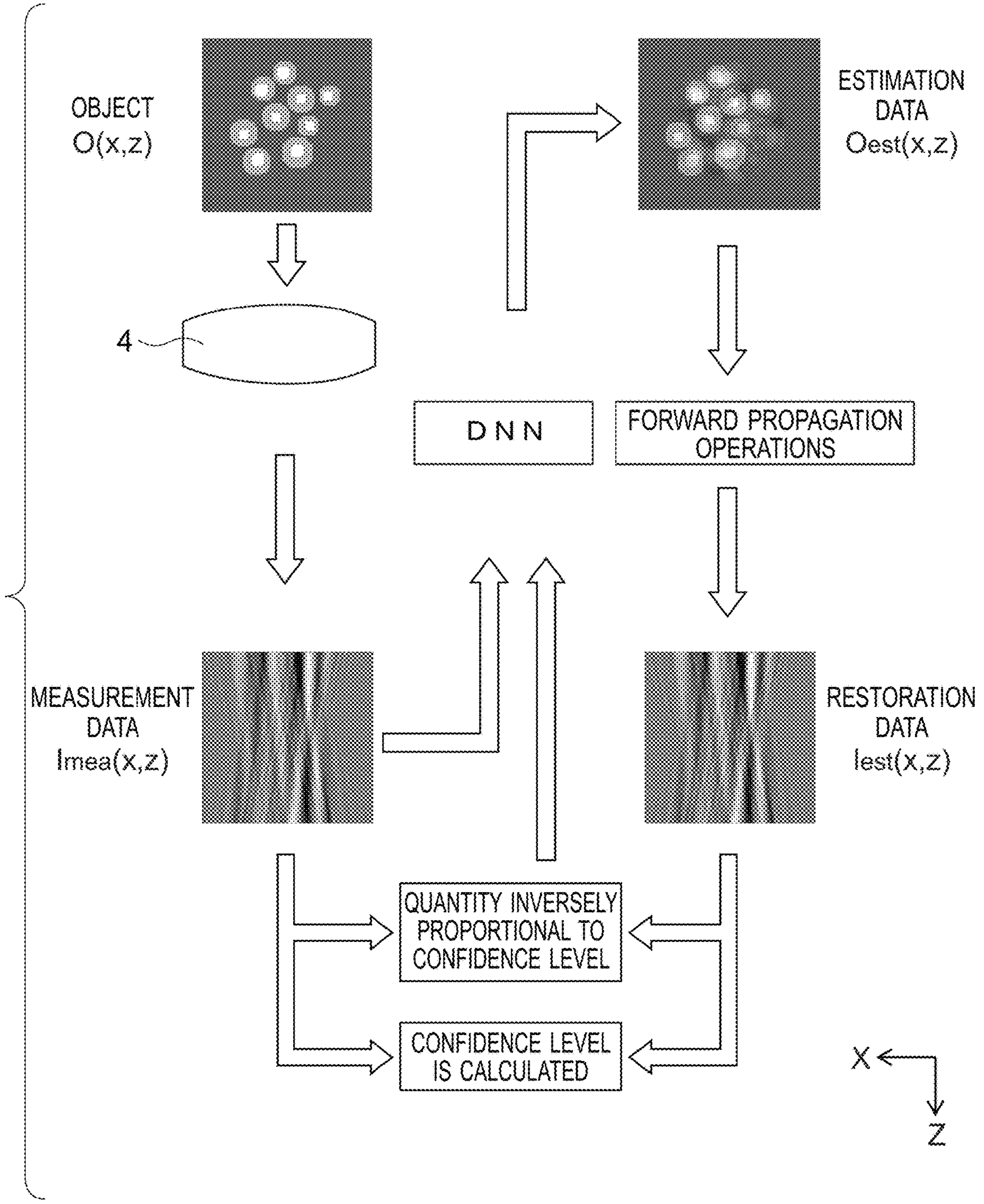
FIG. 15 is a diagram illustrating the data processing method of the second embodiment.

FIG. 14 is a flowchart of the data processing method of the second embodiment. The same steps as those in FIG. 2 are denoted by the same numerals and will not be further elaborated. FIG. 15 is a diagram illustrating the data processing method of the second embodiment. The images illustrated in FIG. 15 are images in XZ cross section. The same configurations as those in FIG. 3 are denoted by the same numerals and terms and will not be further elaborated. A description will be given with reference to FIG. 14 and FIG. 15.

The data processing method of the second embodiment includes step S1, step S2, step S3, step S4, and step S5.

Step S5 is an output step. At step S5, a neural network learns with the quantity inversely proportional to the confidence level as a loss.

In the data processing method of the second embodiment, the neural network is not a trained model. Therefore, optimal parameters are searched for by performing learning.

At step S5, the quantity inversely proportional to the confidence level is obtained based on comparison between the measurement data and the restoration data. As illustrated in FIG. 15, the quantity inversely proportional to the confidence level is input into the DNN. The degree of deviation of the restoration data from the measurement data can be understood from the quantity inversely proportional to the confidence level. By inputting the quantity inversely proportional to the confidence level into the DNN, it is possible to perform learning in the DNN. As a result, it is possible to calculate the confidence level with higher accuracy.

Further, by comparing the measurement data with the restoration data, it is possible to determine whether the estimation data correctly represents the three-dimensional optical characteristic of the object. It is possible to obtain a more correct three-dimensional optical characteristic of the object in the estimation data as the learning in the DNN proceeds.

In the data processing method of the second embodiment, switching between a learning mode and an estimation mode is performed. In the learning mode, the quantity inversely proportional to the confidence level is input into the DNN. In the estimation mode, the confidence level is output.

Figure 16:
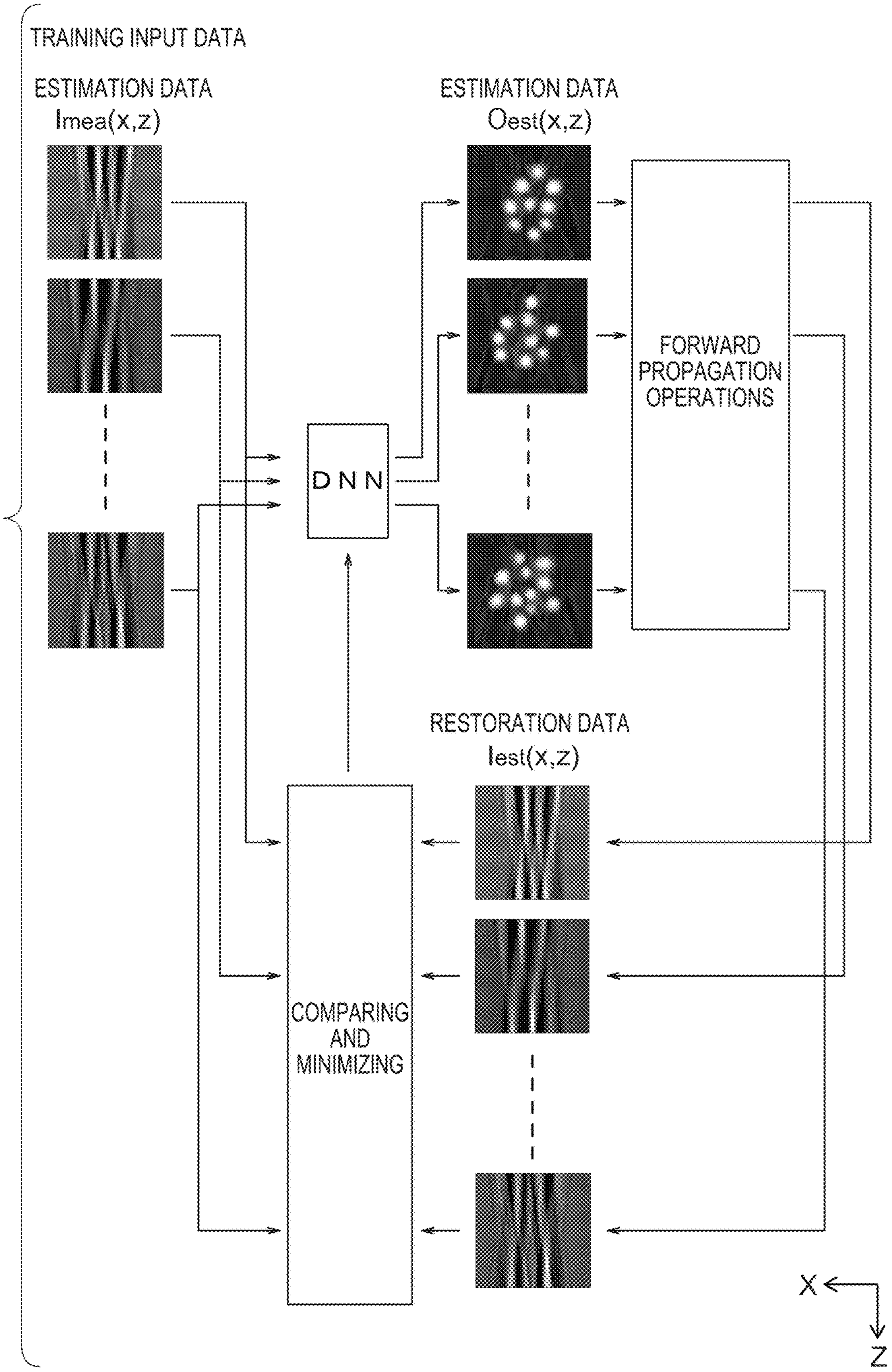
FIG. 16 is a diagram illustrating a manner of learning in a DNN.

FIG. 16 is a diagram illustrating a manner of learning in a DNN. The images illustrated in FIG. 16 are images in XZ cross section.

FIG. 16 illustrates a manner of performing learning using a plurality of pieces of measurement data. In a process in comparing and minimizing, the quantity inversely proportional to the confidence level can be obtained.

It is possible to calculate the confidence level with higher accuracy with more data used in learning. As a result, it is possible to obtain a more correct three-dimensional optical characteristic of the object in the estimation data.

In the data processing method of the present embodiment, it is preferable that a difference between the measurement data and the restoration data be calculated and the confidence level be calculated based on the difference.

It is possible to find the absolute sum of the difference in corresponding data between the measurement data and the restoration data and calculate the confidence level using the absolute sum as an index. For example, it is possible to calculate the confidence level by multiplying a coefficient inversely proportional to the absolute sum. It is possible to calculate the confidence level by comparison with a preset threshold. It is possible to find the threshold in advance by experiment. It is possible to normalize the absolute sum and compare the normalized absolute value with a threshold.

By using the difference between the measurement data and the restoration data, it is possible to easily calculate the confidence level.

In the data processing method of the present embodiment, it is preferable that a correlation between the measurement data and the restoration data be calculated and the confidence level be calculated based on the correlation.

The peak of the correlation is represented by the following equation. Here, er itself may be used as the confidence level, or er may be multiplied by a coefficient and used as the confidence level. Further, the confidence level may be calculated by comparing er with a preset threshold. For example, when er is greater than a preset threshold of 0.5, the confidence level may be calculated as 1.0 (a value indicating a high confidence level).

$$er=\max(\mathrm{corr}(cM_{x,y,z},M_{x,y,z}))$$

where

Mx,y,z is the measurement data, cMx,y,z is the restoration data, and max( ) is a function to find the maximum value (peak).

A correlation function corr( ) between the measurement data and the restoration data is represented by the following equation.

$$\mathrm{corr}(x1, x2) = \sum_{r1} x1(r1)x2(r1 + r2)$$

where x1 and x2 are images of intensity distributions for which correlation is calculated, and r1 and r2 are spatial coordinates x,y,z.

By using the correlation between the measurement data and the restoration data, it is possible to calculate the confidence level with high accuracy.

As explained above, it is possible to use the peak of the correlation in calculation of the confidence level. However, the degree of correlation broadening, specifically, the degree of broadening in the vicinity of a peak may be used in calculation of the confidence level. The smaller the broadening is, the higher the confidence level is. For example, px, py, pz, s are obtained by fitting the vicinity of a peak of corr( ) by the following equation. When s is small, the confidence level is high.

$$G(px, py, pz, s) = \frac{1}{\sqrt[3]{2\pi} s^3}\exp\left(-\frac{(x-px)^2+(y-py)^2+(z-pz)^2}{2s^2}\right)$$

where x, y, z are spatial coordinates, px, py, pz are the spatial coordinates of a peak position, and s is the standard deviation.

In the data processing method of the present embodiment, it is preferable that a sum of squares of a difference between the measurement data and the restoration data be calculated and the confidence level be calculated based on a magnitude of the sum of squares of the difference.

For example, it is possible to determine the confidence level by multiplying the sum of squares of the difference between the measurement data and the restoration data by a coefficient. It is possible to calculate the confidence level by comparison with a preset threshold. It is possible to find the threshold in advance by experiment. It is possible to normalize the absolute sum and compare the normalized absolute value with a threshold.

The sum of squares of the difference between the measurement data and the restoration data is represented by the following equation.

$$er = \|cM_{x,y,z} - M_{x,y,z}\|_{l2}^2$$

where

Mx,y,z is the measurement data, and cMx,y,z is the restoration data.

By using the sum of squares of the difference between the measurement data and the restoration data, it is possible to calculate the confidence level with high accuracy.

It is preferable that the data processing method of the present embodiment include: a first neural network; and a second neural network, the first neural network be the neural network, the second neural network be a trained model, and the confidence level be calculated using the second neural network.

Figure 17:
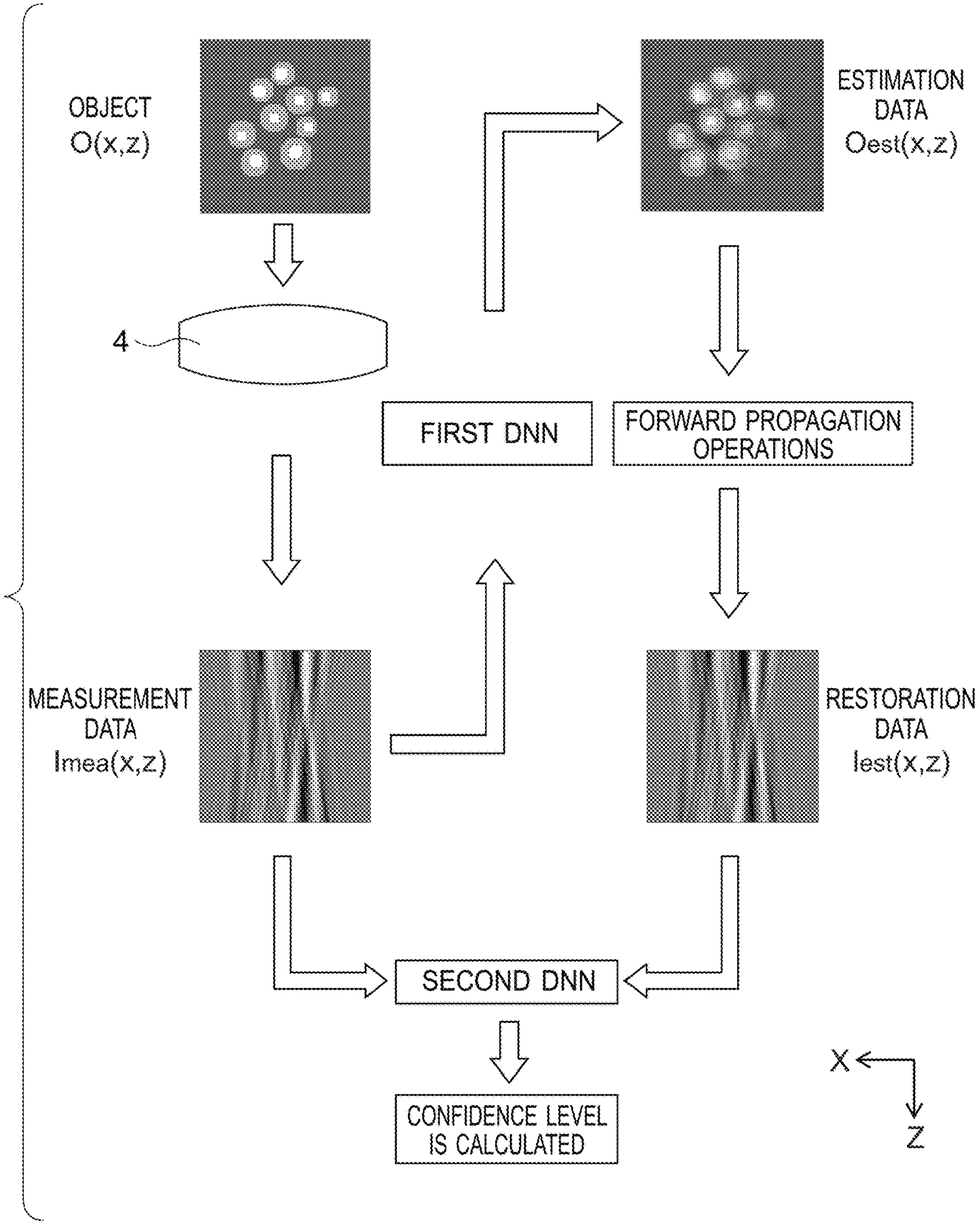
FIG. 17 is a diagram illustrating a method of calculating a confidence level.

FIG. 17 is a diagram illustrating a method of calculating a confidence level. The same configurations as those in FIG. 3 are denoted by the same numerals and terms and will not be further elaborated.

The data processing method of the present embodiment includes a first neural network and a second neural network. The first neural network is the neural network in the data processing method of the first embodiment or the neural network in the data processing method of the second embodiment.

The second neural network is a trained model. The confidence level is calculated using the second neural network.

A case where the first neural network and the second neural network are used will be described. A first DNN is the first neural network. A second DNN is the second neural network. The first DNN is the same as the DNN illustrated in FIG. 3 and will not be further elaborated.

The second DNN is a trained model. The measurement data and the restoration data are input into the second DNN. In the second DNN, the confidence level is calculated from the measurement data and the restoration data.

Figure 18:
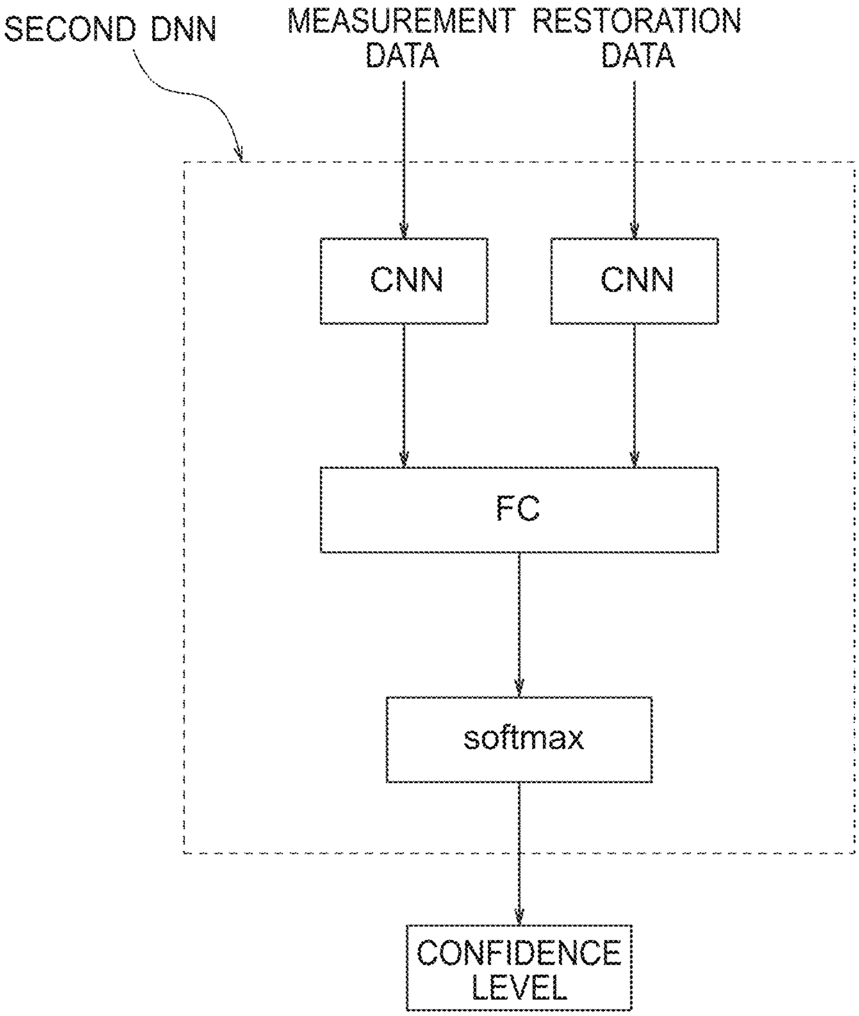
FIG. 18 is a diagram illustrating a process in calculation of a confidence level in a second DNN.

FIG. 18 is a diagram illustrating a process in calculation of the confidence level in the second DNN. The second DNN includes CNN, FC, and softmax.

CNN is a convolutional neural network. In the convolution neural network, convolution and pooling are performed. In the convolution, a gray-scale pattern of an image is detected and features of an object are extracted. In the pooling, a process of considering the object as the same object even when its position changes is performed. Feature portions are extracted from an image by convolution and pooling.

FC is full connection. In the full connection, a feature variable is output from the image data from which feature portions have been extracted. In softmax, a value from 0 to 1 is calculated based on the feature variable. Since the calculated value represents a probability, the calculated value is used as the confidence level.

The first DNN is the DNN illustrated in FIG. 3. Therefore, the first DNN calculates the estimation data. On the other hand, the second DNN calculates the confidence level. Thus, the learning in the second DNN is different from the learning in the first DNN. The learning in the second DNN will be described.

In the data processing method of the present embodiment, it is preferable that the second neural network learn using a first training data set group and a second training data set group.

The first training data set group includes a plurality of first training data sets. The first training data sets each include first data, first corrected data, and teaching data indicating true between true and false.

The second training data set group includes a plurality of second training data sets. The second training data sets each include the first data, second corrected data, and teaching data indicating false between true and false.

The first corrected data is data obtained by performing a correction process on the first data. The second corrected data is data obtained by performing a correction process on second data. The second data is different from the first data.

The first data and the second data are data obtained by measuring light transmitted through the object or data generated by performing forward propagation operations on an object model that models the three-dimensional optical characteristic of the object.

Figure 19A:
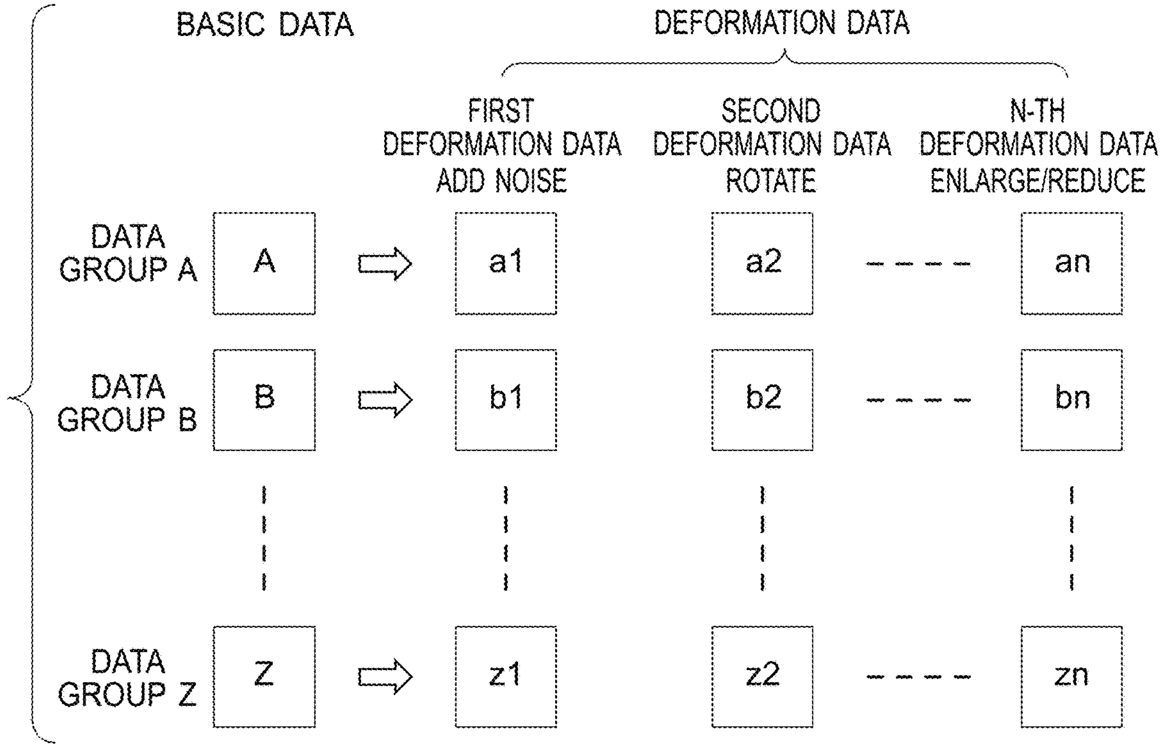
FIGS. 19A and 19B are diagrams illustrating data for training.
Figure 19B:
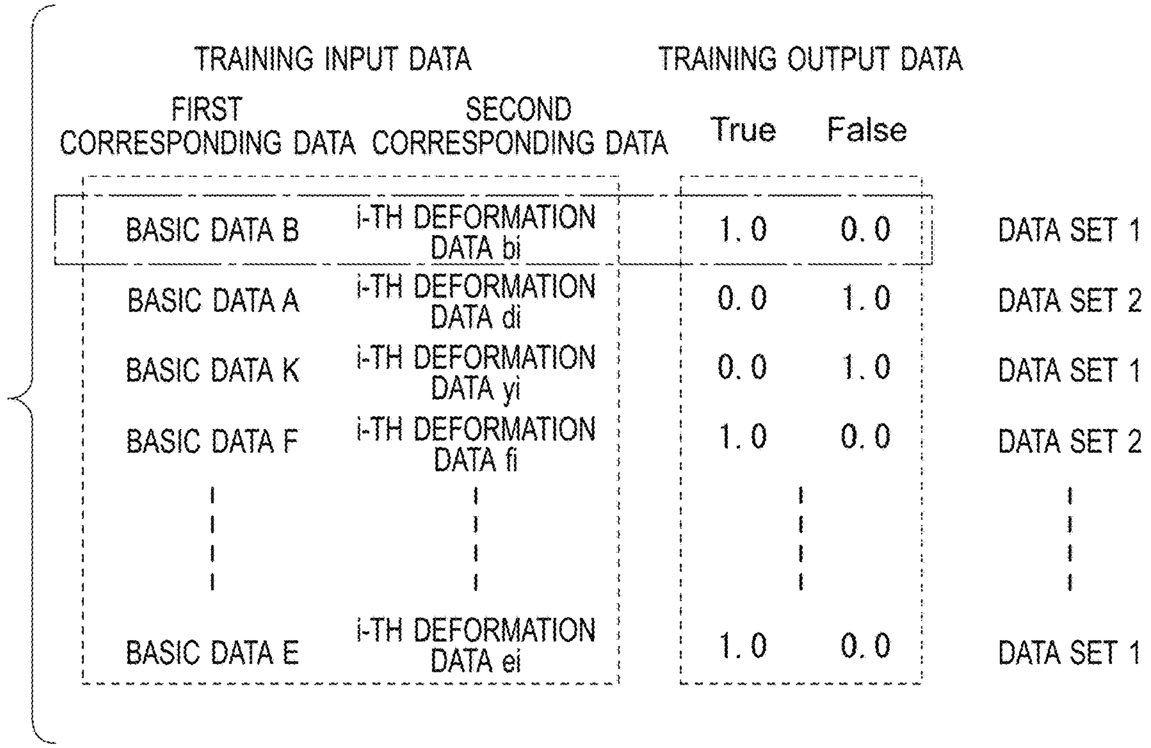

FIGS. 19A and 19B are diagrams illustrating data for training. FIG. 19A is a diagram illustrating generation of data for training. FIG. 19B is a diagram illustrating the relation between training input data and training output data.

The data for training includes a plurality of data groups. FIG. 19A illustrates data group A, data group B, and data group Z.

As illustrated in FIG. 19A, the data groups each include basic data and deformation data. The basic data in one data group is different from the basic data in the other data groups. When an image is generated using data, the image in the basic data of data group A is different from the image in the basic data of data group B and the image in the basic data of data group Z.

The deformation data is data obtained by deforming the basic data. In deformation of data, for example, enlargement, reduction, rotation, and/or noise addition may be performed.

The number of pieces of deformation data is at least one. FIG. 19A illustrates basic data, first deformation data, second deformation data, and N-th deformation data. In the first deformation data, noise is added to the basic data. In the second deformation data, the basic data is rotated. In the N-th deformation data, the basic data is enlarged or the basic data is reduced.

For data group A, basic data A, first deformation data a1, second deformation data a2, and N-th deformation data an are illustrated. For data group B, basic data B, first deformation data b1, second deformation data b2, and N-th deformation data bn are illustrated. For data group Z, basic data Z, first deformation data z1, second deformation data z2, and N-th deformation data zn are illustrated.

As illustrated in FIG. 18, the measurement data and the restoration data are used in calculation of the confidence level. In learning in the second neural network, data corresponding to the measurement data (hereinafter referred to as "first corresponding data") and data corresponding to the restoration data (hereinafter referred to as "second corresponding data") are selected from the data for training.

The basic data is used as the first corresponding data. The deformation data is used as the second corresponding data. The first corresponding data corresponds to the above first data. The second corresponding data corresponds to the above first corrected data or second corrected data.

It is possible to select the first corresponding data and the second corresponding data from one data group. For example, from data group B, basic data B is selected as the first corresponding data, and second deformation data b2 is selected as the second corresponding data. The second deformation data b2 is data obtained by deforming the basic data B. Thus, the degree of similarity between the second deformation data b2 and the basic data B is high.

Further, it is possible to select the first corresponding data and the second corresponding data from two data groups. For example, from data group A, basic data A is selected as the first corresponding data, and from data group B, first deformation data b1 is selected as the second corresponding data. The first deformation data b1 is not data obtained by the deforming basic data A. Thus, the degree of similarity between the first deformation data b1 and the basic data A is low.

In this way, when data selected as the first corresponding data and data selected as the second corresponding data are data selected from the same data group, the degree of similarity between the two pieces of data is high. On the other hand, when data selected as the first corresponding data and data selected as the second corresponding data are data selected from different data groups, the degree of similarity between the two pieces of data is low.

It is possible that the degree of similarity is considered as a confidence level. As illustrated in FIG. 19B, in the second DNN, training input data is created by changing combinations of the first corresponding data and the second corresponding data in various ways. Training output data is obtained by inputting the training input data into the second DNN. A numerical value in the training output data is a value of the softmax function and can be used as a value representing the confidence level.

As indicated by a dot-dash line, when the training input data and the training output data are considered as one set, two kinds of training data sets are used in learning. A first training data set is a data set 1 illustrated in FIG. 19B. A second training data set is a data set 2 illustrated in FIG. 19B.

In the training output data of the data set 1, the value of True is 1.0 and the value of False is 0.0. Assuming that the data representing truth or false of the output result is teaching data, the training output data of the data set 1 is teaching data indicating true between true and false.

In the training output data of the data set 2, the value of True is 0.0 and the value of False is 1.0. Therefore, the training output data of the data set 2 is teaching data indicating false between true and false.

The first training data set includes first corresponding data, second corresponding data, and teaching data indicating true between true and false. In the first training data set, the data group to which the second corresponding data belongs is the same as the data group to which the first corresponding data belongs.

The second training data set includes first corresponding data, second corresponding data, and teaching data indicating false between true and false. In the second training data set, the data group to which the second corresponding data belongs is different from the data group to which the first corresponding data belongs.

For example, it is possible to use the measurement data illustrated in FIG. 3, the first comparison data illustrated in FIG. 5, or the second comparison data illustrated in FIG. 5 as the first corresponding data.

Further, the first corresponding data may be data generated by generating an object model that models the three-dimensional optical characteristic of an object and performing forward propagation operations on the generated object model. This data is the same kind of data as the measurement data and corresponds to the measurement data.

(Learning in Second DNN)

Figure 20:
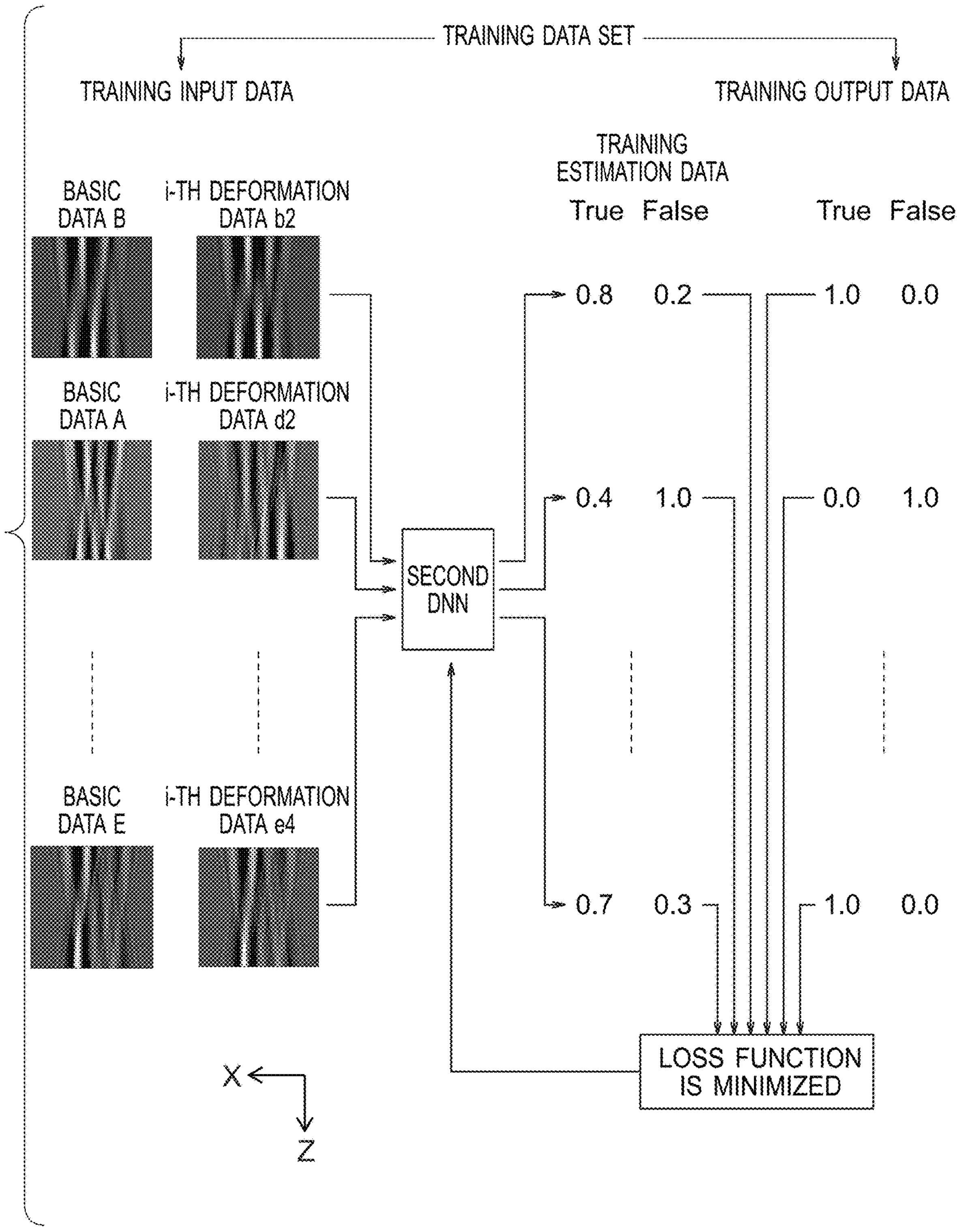
FIG. 20 is a diagram illustrating a manner of learning in the second DNN.

FIG. 20 is a diagram illustrating a manner of learning in the second DNN. The images illustrated in FIG. 20 are images in XZ cross section.

In FIG. 20, it is possible to use the confidence level in determination as to whether two pieces of data are similar. The measurement data is used for the basic data. As described above, the measurement data is data obtained by measuring light transmitted through an object. Since the measurement data is used for the basic data, the deformation data is also data obtained by deforming the measurement data.

Learning in the second DNN is basically the same as learning in the DNN illustrated in FIG. 12. Therefore, a detailed explanation is omitted. The differences between the learning in the second DNN and the learning in the DNN illustrated in FIG. 12 are as follows.

(I) Number of Pieces of Training Input Data

In the second DNN, the number of pieces of training input data is two. In the DNN illustrated in FIG. 12, the number of pieces of training input data is one.

(II) Kind of Training Output Data is Kind of Training Input Data

In the second DNN, the kind of training output data is different from the kind of training input data. In the DNN illustrated in FIG. 12, the kind of training output data is the same as the kind of training input data. For example, in the second DNN, a numerical value is output from two images. In the DNN illustrated in FIG. 12, one image is output from one image.

It is preferable that the data processing method of the present embodiment further include a presentation step of presenting the confidence level.

As described above, in the data processing method of the embodiment, it is possible to obtain the confidence level. Thus, it is possible to make various presentations using the confidence level.

Further, it is possible to make various sounds using the confidence level. For example, it is possible to make a sound only when the confidence level is low. It is possible to present the confidence level to the user in the form of display or sound.

(First Presentation Method)

Figure 21A:
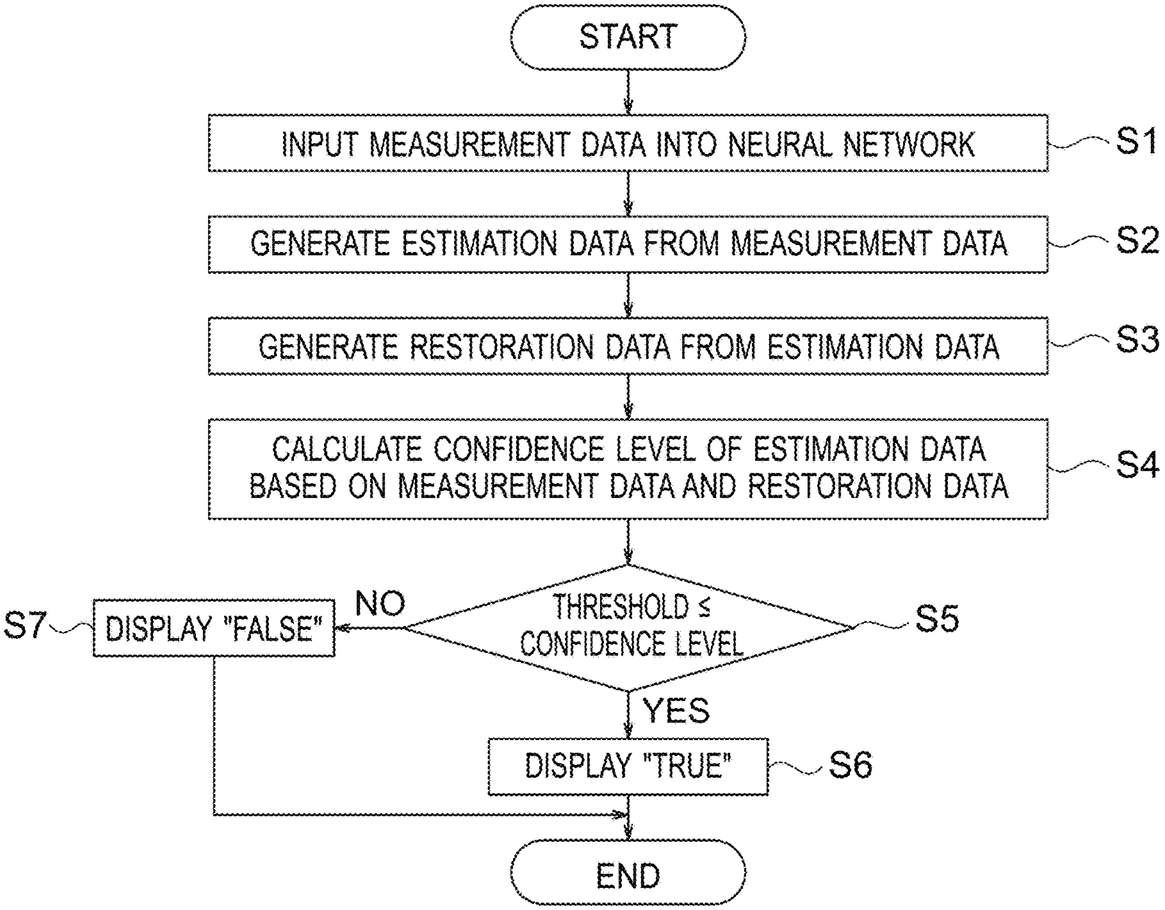
FIGS. 21A, 21B, and 21C are diagrams illustrating a first presentation method.
Figure 21B:
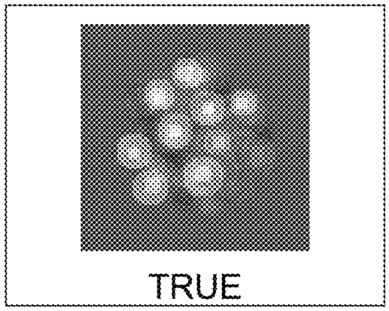
Figure 21C:
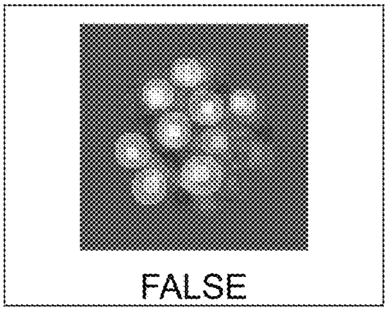

FIGS. 21A, 21B, and 21C are diagrams illustrating a first presentation method. FIG. 21A is a flowchart of the first presentation method. FIG. 21B and FIG. 21C are diagrams illustrating presentation examples. The same steps as those in FIG. 2 are denoted by the same numerals and will not be further elaborated.

The first presentation method includes step S5, step S6, and step S7.

At step S5, comparison between a threshold and a value of the confidence level is performed. If the value of the confidence level is greater than the threshold, step S6 is executed. If the value of the confidence level is equal to the threshold or if the value of the confidence level is greater than the threshold, step S6 is executed. If the value of the confidence level is less than the threshold, step S7 is executed.

At step S6, "TRUE" is displayed. As illustrated in FIG. 21B, it is possible to display a text "TRUE" together with the image. At step S7, "FALSE" is displayed. As illustrated in FIG. 21C, it is possible to display a text "FALSE" together with the image.

The value of the confidence level is not necessarily compared with one threshold. For example, it is possible to display a text "high confidence", "medium confidence", or "low confidence" using two thresholds.

Display may be performed at only one of step S6 and step S7. Further, colors different between steps S6 and S7 may be displayed. For example, it is possible to display blue at step S6 and display red at step S7. It is possible to use LEDs of certain colors.

(Second Presentation Method)

Figure 22A:
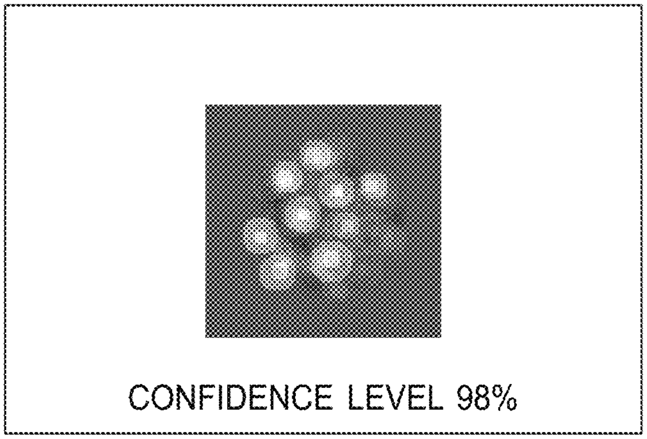
FIGS. 22A, 22B, and 22C are diagrams illustrating a second presentation method.
Figure 22B:
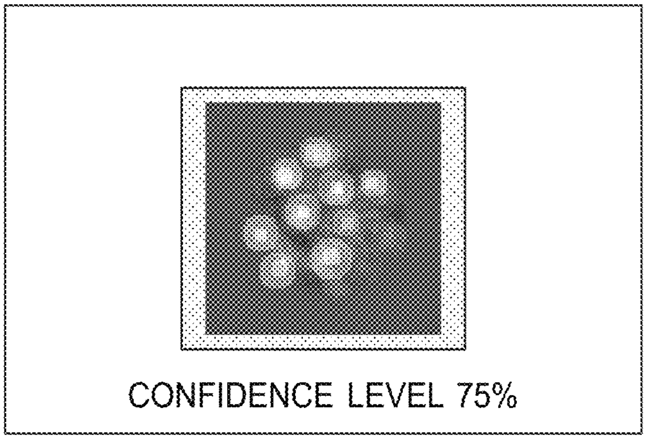
Figure 22C:
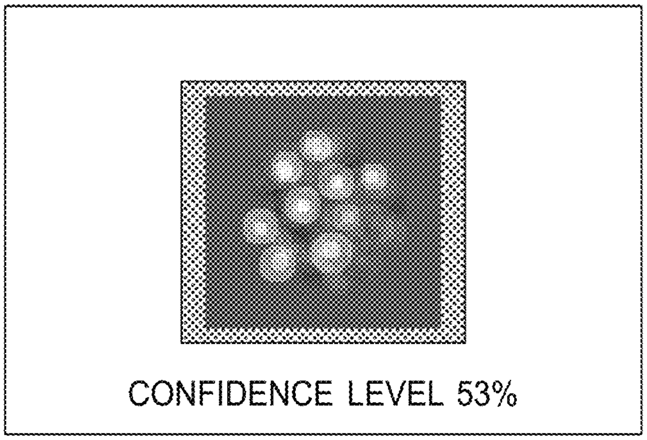

FIGS. 22A, 22B, and 22C are diagrams illustrating a second presentation method. FIG. 22A is a diagram illustrating the presentation in a case where the confidence level is high. FIG. 22B is a diagram illustrating the presentation in a case where the confidence level is medium. FIG. 22C is a diagram illustrating the presentation in a case where the confidence level is low.

In the second DNN, a numerical value is output. Thus, it is possible to obtain a numerical value of the confidence level, based on the numerical value output from the second DNN. As a result, it is possible to represent the confidence level by a numerical value, as illustrated in FIG. 22A, FIG. 22B, and FIG. 22C. The surrounding of the image may be colored in accordance with the value of the confidence level. For example, when the confidence level is medium, the image is surrounded by yellow. When the confidence level is low, the image is surrounded by red.

Further, the following texts may be displayed.

(i) When the confidence level is medium

"Reconstruction result may be wrong."

(ii) When the confidence level is low

"Reconstruction result is wrong. Please measure again."

A data processing device of the present embodiment will be described using a data processing device of the first embodiment and a data processing device of the second embodiment.

The data processing device of the first embodiment includes a memory and a processor. The memory stores therein measurement data. The processor executes an estimation process of estimating a three-dimensional optical characteristic of an object. The three-dimensional optical characteristic is a refractive index distribution or an absorptance distribution.

The estimation process includes an input step of inputting measurement data into a neural network, an estimation step of generating estimation data from the measurement data, a restoration step of generating restoration data from the estimation data, and a calculation step of calculating a confidence level of the estimation data based on the measurement data and the restoration data.

The neural network is a trained model, the measurement data is data obtained by measuring light transmitted through an object, and the estimation data is data of a three-dimensional optical characteristic of the object estimated from the measurement data.

In the estimation, the neural network is used, in the restoration, forward propagation operations are performed on the estimation data, and in the forward propagation operations, wavefronts passing through the interior of the object estimated from the measurement data are sequentially obtained in a direction in which light travels.

The data processing device of the second embodiment includes a memory and a processor. The memory stores therein measurement data. The processor executes an estimation process of estimating a three-dimensional optical characteristic of an object. The three-dimensional optical characteristic is a refractive index distribution or an absorptance distribution.

The estimation process includes an input step of inputting measurement data into a neural network, an estimation step of generating estimation data from the measurement data, a restoration step of generating restoration data from the estimation data, a calculation step of calculating a confidence level of the estimation data, based on the measurement data and the restoration data, and a learning step of learning by the neural network with a quantity inversely proportional to the confidence level as a loss.

The measurement data is data obtained by measuring light transmitted through an object, and the estimation data is data of a three-dimensional optical characteristic of the object estimated from the measurement data.

In the estimation, the neural network is used, in the restoration, forward propagation operations are performed on the estimation data, and in the forward propagation operations, wavefronts passing through the interior of the object estimated from the measurement data are sequentially obtained in a direction in which light travels.

Figure 23:
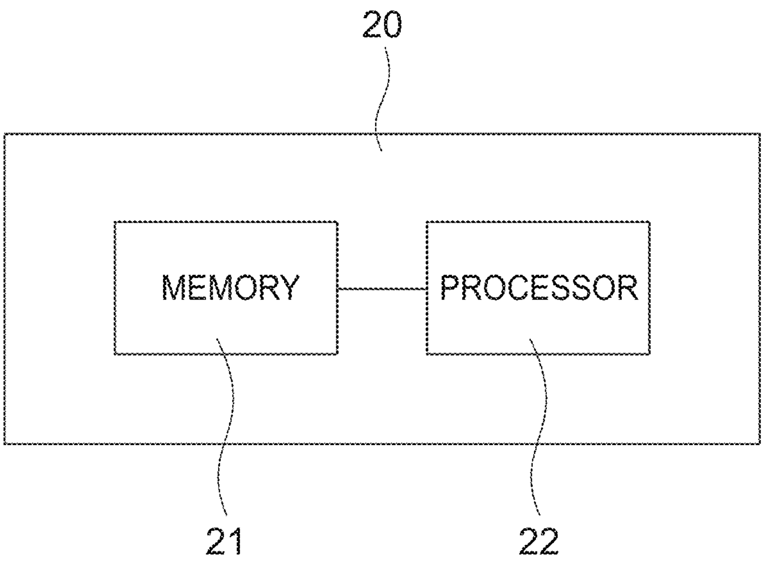
FIG. 23 is a diagram illustrating a data processing device of the present embodiment.

FIG. 23 is a diagram illustrating a data processing device of the present embodiment. A data processing device 20 includes a memory 21 and a processor 22. The memory 21 stores therein measurement data. The processor 22 executes a process of calculating the confidence level of the estimation data. The three-dimensional optical characteristic is a refractive index distribution or an absorptance distribution.

In the data processing device 20, the data processing method of the first embodiment or the data processing method of the second embodiment is used. Therefore, a detailed explanation is omitted.

A three-dimensional observation device of the present embodiment will be described using a three-dimensional observation device of the first embodiment and a three-dimensional observation device of the second embodiment.

The three-dimensional observation device of the first embodiment includes the data processing device of the first embodiment or the data processing device of the second embodiment, a light source that emits light to illuminate an object, and a sensor that receives light transmitted through the object and generates a signal.

Figure 24:
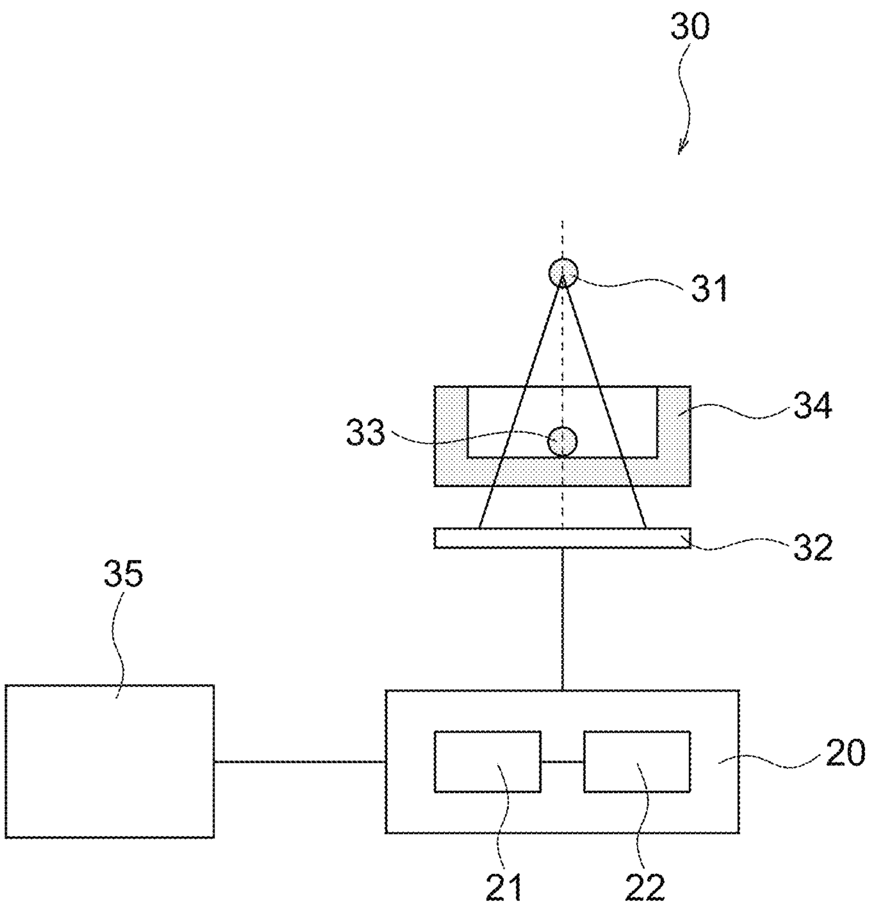
FIG. 24 is a diagram illustrating a three-dimensional observation device of the first embodiment.

FIG. 24 is a diagram illustrating the three-dimensional observation device of the first embodiment. The same configurations as those in FIG. 23 are denoted by the same numerals and will not be further elaborated.

A three-dimensional observation device 30 includes a light source 31 and a sensor 32. The light source 31 emits light to illuminate an object 33. The object 33 is illuminated by the light emitted from the light source 31. The object 33 is held in a petri dish 34. The sensor 32 receives light transmitted through the object 33 and generates a signal (hereinafter referred to as "detection signal").

The detection signal is input to the data processing device 20. In the data processing device 20, data is generated from the detection signal. Data may be generated from the detection signal and the generated data may be input to the data processing device 20. The generated data is data obtained by measuring light transmitted through the object 33. Therefore, in the data processing device 20, the confidence level is calculated using the measurement data.

The three-dimensional observation device of the second embodiment includes a light source, a sensor, an illumination system that irradiates an object with illumination light, and an optical system that guides the illumination light to the object and guides light transmitted through the object to the sensor.

Figure 25:
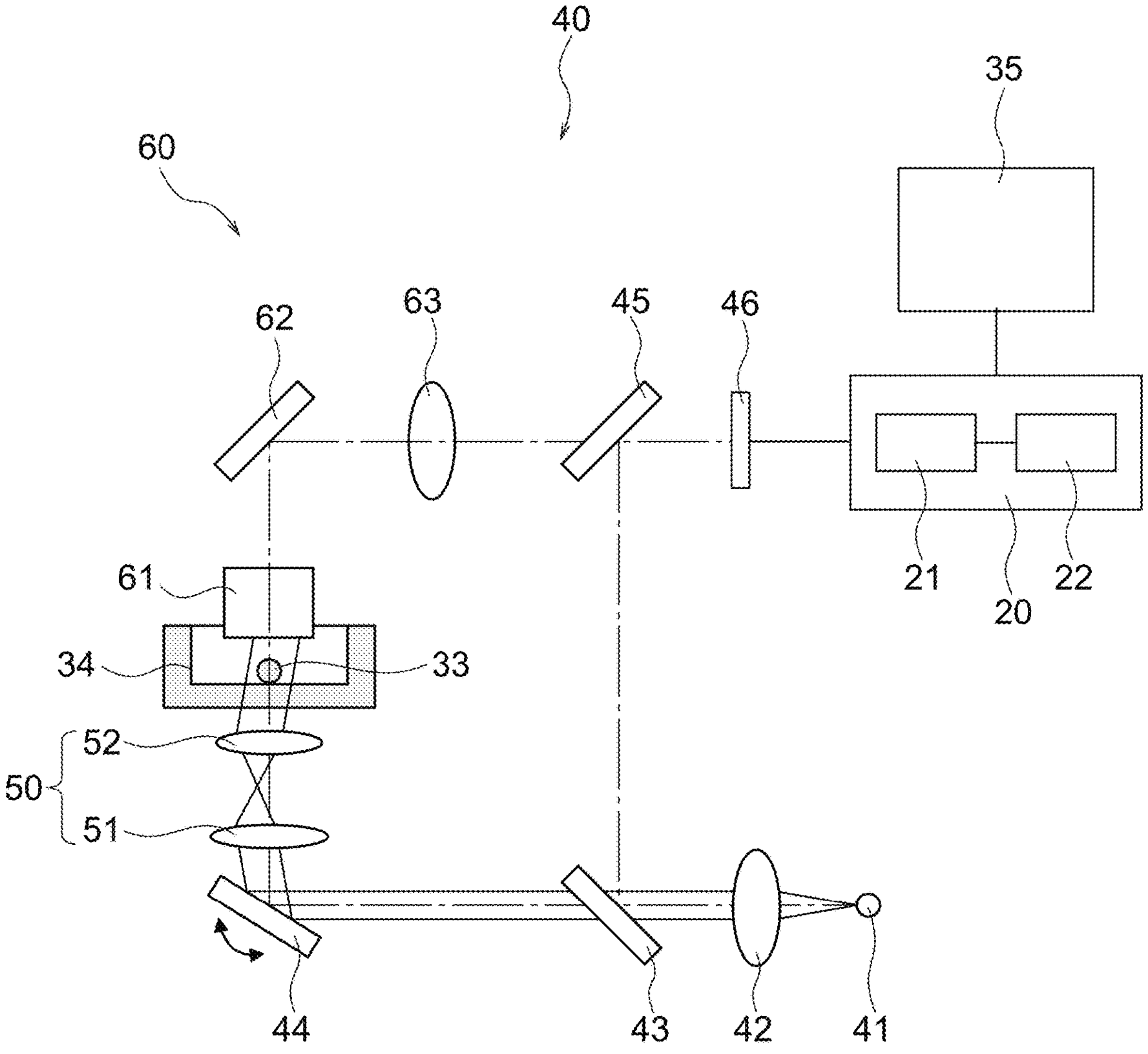
FIG. 25 is a diagram illustrating a three-dimensional observation device of the second embodiment.

FIG. 25 is a diagram illustrating the three-dimensional observation device of the second embodiment. The same configurations as those in FIG. 24 are denoted by the same numerals and will not be further elaborated.

A three-dimensional observation device 40 includes a light source 41, a collimating lens 42, a half mirror 43, a mirror 44, an illumination system 50, a detection system 60, a half mirror 45, and a sensor 46.

The light source 41 emits light to illuminate an object 33. The sensor 46 receives light transmitted through the object 33 and generates a signal. The object 33 is held in a petri dish 34.

The light emitted from the light source 41 is incident on the collimating lens 42. Parallel light is emitted from the collimating lens 42. The parallel light is incident on the half mirror 43. Reflected light and transmitted light are emitted from the half mirror 43. The object 33 is located in the optical path along which the transmitted light travels. Nothing is disposed in the optical path along which the reflected light travels.

The transmitted light is reflected by the mirror 44 and incident on the illumination system 50. The illumination system 50 includes a lens 51 and a lens 52. Parallel light emitted from the illumination system 50 irradiates the object 33. Parallel light emitted from the object 33 is incident on the detection system 60.

The detection system 60 includes an objective lens 61, a mirror 62, and an imaging lens 63. Parallel light incident on the objective lens 61 is gathered by the objective lens 61 and then incident on the imaging lens 63. Divergent light is incident on the imaging lens 63.

The focus position of the imaging lens 63 is coincident with the light gathering position in the objective lens 61. Therefore, parallel light is emitted from the imaging lens 63. The parallel light is incident on the half mirror 45. Parallel light reflected by the half mirror 43 is incident on the half mirror 45.

Parallel light that passes through the object 33 passes through the half mirror 43, and parallel light that does not pass through the object 33 is reflected by the half mirror 43. Thus, the parallel light that passes through the object 33 and the parallel light that does not pass through the object 33 are incident on the sensor 46. As a result, interference fringes are formed. The interference fringes are picked up by the sensor 46. A detection signal is output from the sensor 46.

The detection signal is input to the data processing device 20. In the data processing device 20, data is generated from the detection signal. Data may be generated from the detection signal and the generated data may be input to the data processing device 20. The generated data is data obtained by measuring light transmitted through the object 33. Therefore, in the data processing device 20, the confidence level is calculated using the measurement data.

In the three-dimensional observation device 40, light illuminating the object 33 is deflected by the mirror 44. Thus, it is possible to illuminate the object 33 at different illumination angles. In this case, as illustrated in FIG. 7, it is possible to increase the accuracy of the reconstruction data.

It is preferable that the three-dimensional observation device of the present embodiment further include a presentation unit that presents the confidence level.

As illustrated in FIG. 24, the three-dimensional observation device 30 includes a display unit 35. Further, as illustrated in FIG. 25, the three-dimensional observation device 40 includes a display unit 35. The display unit 35 is a presentation unit. An example of the display unit 35 is a monitor. By providing the display unit 35, it is possible to display the confidence level. It is possible to display the confidence level together with the restoration data.

Instead of the display unit 35, a speaker may be provided. It is possible to output the confidence level from the speaker as sound information. It is possible to combine the display unit 35 and the speaker into a presentation unit.

A recording medium of the present embodiment will be described using a recording medium of the first embodiment and a recording medium of the second embodiment.

The recording medium of the first embodiment is a computer-readable recording medium storing therein a program. The recording medium stores therein a program for causing a computer including a memory and a processor to execute an estimation process.

In the estimation process, a three-dimensional optical characteristic of an object is estimated. The three-dimensional optical characteristic is a refractive index distribution or an absorptance distribution.

The processor is caused to execute a process of inputting measurement data stored in the memory into a neural network, a process of generating estimation data from the measurement data, a process of generating restoration data from the estimation data, and a process of calculating a confidence level of the estimation data, based on the measurement data and the restoration data.

The neural network is a trained model, the measurement data is data obtained by measuring light transmitted through an object, and the estimation data is data of a three-dimensional optical characteristic of the object estimated from the measurement data.

In the estimation, the neural network is used, in the restoration, forward propagation operations are performed on the estimation data, and in the forward propagation operations, wavefronts passing through the interior of the object estimated from the measurement data are sequentially obtained in a direction in which light travels.

The recording medium of the second embodiment is a computer-readable recording medium storing therein a program. The recording medium stores therein a program for causing a computer including a memory and a processor to execute an estimation process.

In the estimation process, a three-dimensional optical characteristic of an object is estimated. The three-dimensional optical characteristic is a refractive index distribution or an absorptance distribution.

The processor is caused to execute a process of inputting measurement data stored in the memory into a neural network, a process of generating estimation data from the measurement data, a process of generating restoration data from the estimation data, a process of calculating a confidence level of the estimation data, based on the measurement data and the restoration data, and a process of learning by the neural network with a quantity inversely proportional to the confidence level as a loss.

The measurement data is data obtained by measuring light transmitted through an object, and the estimation data is data of a three-dimensional optical characteristic of the object estimated from the measurement data.

In the estimation, the neural network is used, in the restoration, forward propagation operations are performed on the estimation data, and in the forward propagation operations, wavefronts passing through the interior of the object estimated from the measurement data are sequentially obtained in a direction in which light travels.

A learning method of the present embodiment is a learning method for a neural network to calculate a confidence level of estimation data, in which the confidence level of the estimation data is calculated based on measurement data and restoration data.

The measurement data is data obtained by measuring light transmitted through an object, the estimation data is data of a three-dimensional optical characteristic of the object estimated from the measurement data, and the three-dimensional optical characteristic is a refractive index distribution or an absorptance distribution.

The restoration data is data generated by performing forward propagation operations on the estimation data. In the forward propagation operations, wavefronts passing through the interior of the object estimated from the measurement data are obtained sequentially in a direction in which light travels.

The learning method of the present embodiment includes a first learning step of learning using a first training data set and a second learning step of learning a second training data set, and the first learning step and the second learning step are repeatedly performed.

The first training data set includes first data, first corrected data, and teaching data indicating true between true and false, and the second training data set includes the first data, second corrected data, and teaching data indicating false between true and false.

The first corrected data is data obtained by performing a correction process on the first data. The second corrected data is data obtained by performing a correction process on second data. The second data is different from the first data.

The first data and the second data are data obtained by measuring light transmitted through the object or data generated by performing forward propagation operations on an object model that models the three-dimensional optical characteristic of the object.

In the learning method of the present embodiment, it is preferable that the correction process performed on the first data and the correction process performed on the second data include at least one process among a deforming process, a rotating process, and a noise adding process.

A learning device of the present embodiment includes a memory and a processor. The memory stores therein measurement data. The processor executes a learning process for a neural network that calculates a confidence level of estimation data.

The confidence level of the estimation data is calculated based on measurement data and restoration data. The measurement data is data obtained by measuring light transmitted through an object, the estimation data is data of a three-dimensional optical characteristic of the object estimated from the measurement data, and the three-dimensional optical characteristic is a refractive index distribution or an absorptance distribution.

The restoration data is data generated by performing forward propagation operations on the estimation data. In the forward propagation operations, wavefronts passing through the interior of the object estimated from the measurement data are obtained sequentially in a direction in which light travels.

The learning process includes a first learning step of learning using a first training data set and a second learning step of learning using a second training data set, and the first learning step and the second learning step are repeatedly performed.

The first training data set includes first data, first corrected data, and teaching data indicating true between true and false, and the second training data set includes the first data, second corrected data, and teaching data indicating false between true and false.

The first corrected data is data obtained by performing a correction process on the first data. The second corrected data is data obtained by performing a correction process on second data. The second data is different from the first data.

The first data and the second data are data obtained by measuring light transmitted through the object or data generated by performing forward propagation operations on an object model that models the three-dimensional optical characteristic of the object.

A recording medium of the present embodiment will be described using a recording medium of a third embodiment.

The recording medium of the third embodiment is a computer-readable recording medium storing therein a program. The recording medium stores therein a program for causing a computer including a memory and a processor to execute a learning process for a neural network.

The neural network calculates a confidence level of estimation data based on measurement data and restoration data. The measurement data is data obtained by measuring light transmitted through an object, the estimation data is data of a three-dimensional optical characteristic of the object estimated from the measurement data, and the three-dimensional optical characteristic is a refractive index distribution or an absorptance distribution.

The restoration data is data generated by performing forward propagation operations on the estimation data. In the forward propagation operations, wavefronts passing through the interior of the object estimated from the measurement data are obtained sequentially in a direction in which light travels.

The learning process includes a first learning step of learning using a first training data set and a second learning step of learning using a second training data set, and the first learning step and the second learning step are repeatedly performed.

The first training data set includes first data, first corrected data, and teaching data indicating true between true and false, and the second training data set includes the first data, second corrected data, and teaching data indicating false between true and false.

The first corrected data is data obtained by performing a correction process on the first data. The second corrected data is data obtained by performing a correction process on second data. The second data is different from the first data.

The first data and the second data are data obtained by measuring light transmitted through the object or data generated by performing forward propagation operations on an object model that models the three-dimensional optical characteristic of the object.

INDUSTRIAL APPLICABILITY

The present disclosure is suitable for a data processing method, a data processing device, a three-dimensional observation device, and a recording medium for generating an index indicating a confidence level of estimation, and a learning method, a learning device, and a recording medium for generating an index indicating a confidence level of estimation.

The present disclosure can provide a data processing method for generating an index indicating a confidence level of estimation and a learning method for generating an index indicating a confidence level of estimation.

[Appendix 1]

A data processing device comprising:
a memory; and
a processor, wherein
the memory stores therein measurement data,
the processor executes an estimation process of estimating a three-dimensional optical characteristic of an object,
the three-dimensional optical characteristic is a refractive index distribution or an absorptance distribution,
the estimation process includes:
an input step of inputting the measurement data into a neural network;
an estimation step of generating estimation data from the measurement data;
a restoration step of generating restoration data from the estimation data; and
a calculation step of calculating a confidence level of the estimation data, based on the measurement data and the restoration data,
the neural network is a trained model,
the measurement data is data obtained by measuring light transmitted through the object,
the estimation data is data of a three-dimensional optical characteristic of the object estimated from the measurement data,
in the estimation, the neural network is used,
in the restoration, forward propagation operations are performed on the estimation data, and
in the forward propagation operations, wavefronts passing through interior of the object estimated from the measurement data are sequentially obtained in a direction in which light travels.

[Appendix 2]

A data processing device comprising:
a memory; and
a processor, wherein
the memory stores therein measurement data,
the processor executes an estimation process of estimating a three-dimensional optical characteristic of an object,
the three-dimensional optical characteristic is a refractive index distribution or an absorptance distribution,
the estimation process includes:
an input step of inputting the measurement data into a neural network;
an estimation step of generating estimation data from the measurement data;
a restoration step of generating restoration data from the estimation data;
a calculation step of calculating a confidence level of the estimation data, based on the measurement data and the restoration data; and
a learning step of learning by the neural network with a quantity inversely proportional to the confidence level as a loss,
the measurement data is data obtained by measuring light transmitted through the object,
the estimation data is data of a three-dimensional optical characteristic of the object estimated from the measurement data,
in the estimation, the neural network is used,
in the restoration, forward propagation operations are performed on the estimation data, and
in the forward propagation operations, wavefronts passing through interior of the object estimated from the measurement data are sequentially obtained in a direction in which light travels.

[Appendix 3]

A learning device comprising: a memory; and a processor, wherein
the memory stores therein measurement data, the processor executes a learning process for a neural network to calculate a confidence level of estimation data, the confidence level of the estimation data is calculated based on the measurement data and restoration data, the measurement data is data obtained by measuring light transmitted through an object, the estimation data is data of a three-dimensional optical characteristic of the object estimated from the measurement data, the three-dimensional optical characteristic is a refractive index distribution or an absorptance distribution, the restoration data is data generated by performing forward propagation operations on the estimation data, in the forward propagation operations, wavefronts passing through interior of the object estimated from the measurement data are sequentially obtained in a direction in which light travels, the learning process includes:

a first learning step of learning using a first training data set; and a second learning step of learning using a second training data set, the first learning step and the second learning step are repeatedly performed, the first training data set includes first data, first corrected data, and teaching data indicating true between true and false, the second training data set includes the first data, second corrected data, and the teaching data indicating false between true and false, the first corrected data is data obtained by performing a correction process on the first data, the second corrected data is data obtained by performing a correction process on second data, the second data is different from the first data, and the first data and the second data are data obtained by measuring light transmitted through the object, or data generated by performing forward propagation operations on an object model that models a three-dimensional optical characteristic of the object.

[Appendix 4]

A computer-readable recording medium storing therein a program for causing a computer including a memory and a processor to execute an estimation process, wherein in the estimation process, a three-dimensional optical characteristic of an object is estimated, the three-dimensional optical characteristic is a refractive index distribution or an absorptance distribution, the program causes the processor to perform:

a process of inputting measurement data stored in the memory into a neural network;

a process of generating estimation data from the measurement data;

a process of generating restoration data from the estimation data; and a process of calculating a confidence level of the estimation data, based on the measurement data and the restoration data, the neural network is a trained model, the measurement data is data obtained by measuring light transmitted through an object, the estimation data is data of a three-dimensional optical characteristic of the object estimated from the measurement data, in the estimation, the neural network is used, in the restoration, forward propagation operations are performed on the estimation data, and in the forward propagation operations, wavefronts passing through interior of the object estimated from the measurement data are sequentially obtained in a direction in which light travels.

[Appendix 5]

A computer-readable recording medium storing therein a program for causing a computer including a memory and a processor to execute an estimation process, wherein in the estimation process, a three-dimensional optical characteristic of an object is estimated, the three-dimensional optical characteristic is a refractive index distribution or an absorptance distribution, the program causes the processor to perform:

a process of inputting measurement data stored in the memory into a neural network;

a process of generating estimation data from the measurement data;

a process of generating restoration data from the estimation data;

a process of calculating a confidence level of the estimation data, based on the measurement data and the restoration data; and a process of learning by the neural network with a quantity inversely proportional to the confidence level as a loss, the measurement data is data obtained by measuring light transmitted through an object, the estimation data is data of a three-dimensional optical characteristic of the object estimated from the measurement data, in the estimation, the neural network is used, in the restoration, forward propagation operations are performed on the estimation data, and in the forward propagation operations, wavefronts passing through interior of the object estimated from the measurement data are sequentially obtained in a direction in which light travels.

[Appendix 6]

A computer-readable recording medium storing therein a program for causing a computer including a memory and a processor to execute a learning process for a neural network, wherein the neural network calculates a confidence level of estimation data based on measurement data and restoration data, the measurement data is data obtained by measuring light transmitted through an object, the estimation data is data of a three-dimensional optical characteristic of the object estimated from the measurement data, the three-dimensional optical characteristic is a refractive index distribution or an absorptance distribution, the restoration data is data generated by performing forward propagation operations on the estimation data, in the forward propagation operations, wavefronts passing through interior of the object estimated from the measurement data are sequentially obtained in a direction in which light travels, the learning process includes:

a first learning step of learning using a first training data set; and a second learning step of learning using a second training data set, the first learning step and the second learning step are repeatedly performed, the first training data set includes first data, first corrected data, and teaching data indicating true between true and false, the second training data set includes the first data, second corrected data, and the teaching data indicating false between true and false, the first corrected data is data obtained by performing a correction process on the first data, the second corrected data is data obtained by performing a correction process on second data, the second data is different from the first data, and the first data and the second data are data obtained by measuring light transmitted through the object, or data generated by performing forward propagation operations on an object model that models a three-dimensional optical characteristic of the object.

[Appendix 7]

A three-dimensional observation device comprising:

the data processing device according to appendix 1 or 2;

a light source configured to emit light to illuminate the object, and a sensor configured to receive light transmitted through the object and generate a signal.

[Appendix 8]

The three-dimensional observation device according to Appendix 7, further comprising:

an illumination system configured to irradiate the object with illumination light; and an optical system configured to guide the illumination light to the object and guide light transmitted through the object to the sensor.

[Appendix 9]

The three-dimensional observation device according to Appendix 7 or 8, further comprising a presentation unit configured to present the confidence level.

What is claimed is:

1. A data processing method comprising:

an input step of inputting measurement data into a neural network;

an estimation step of generating estimation data from the measurement data;

a restoration step of generating restoration data from the estimation data; and a calculation step of calculating a confidence level of the estimation data, based on the measurement data and the restoration data, wherein the neural network is a trained model, the measurement data is data obtained by measuring light transmitted through an object, the estimation data is data of a three-dimensional optical characteristic of the object estimated from the measurement data, the three-dimensional optical characteristic is a refractive index distribution or an absorptance distribution, in the estimation, the neural network is used, in the restoration, forward propagation operations are performed on the estimation data, and in the forward propagation operations, wavefronts passing through interior of the object estimated from the measurement data are sequentially obtained in a direction in which light travels.

2. The data processing method according to claim 1, wherein a difference between the measurement data and the restoration data is calculated, and the confidence level is calculated based on the difference.

3. The data processing method according to claim 1, wherein a correlation between the measurement data and the restoration data is calculated, and the confidence level is calculated based on the correlation.

4. The data processing method according to claim 1, wherein a sum of squares of a difference between the measurement data and the restoration data is calculated, and the confidence level is calculated based on a magnitude of the sum of squares of the difference.

5. The data processing method according to claim 1, comprising:

a first neural network; and a second neural network, wherein the first neural network is the neural network, the second neural network is a trained model, and the confidence level is calculated using the second neural network.

6. The data processing method according to claim 5, wherein the second neural network learns using a first training data set group and a second training data set group, the first training data set group includes a plurality of first training data sets, the first training data sets each include first data, first corrected data, and teaching data indicating true between true and false, the second training data set group includes a plurality of second training data sets, the second training data sets each include the first data, second corrected data, and teaching data indicating false between true and false, the first corrected data is data obtained by performing a correction process on the first data, the second corrected data is data obtained by performing a correction process on second data, the second data is different from the first data, and the first data and the second data are data obtained by measuring light transmitted through the object, or data generated by performing forward propagation operations on an object model that models a three-dimensional optical characteristic of the object.

7. The data processing method according to claim 1, further comprising a presentation step of presenting the confidence level.

8. A data processing method comprising:

an input step of inputting measurement data into a neural network;

an estimation step of generating estimation data from the measurement data;

a restoration step of generating restoration data from the estimation data;

a calculation step of calculating a confidence level of the estimation data, based on the measurement data and the restoration data; and a learning step of learning by the neural network with a quantity inversely proportional to the confidence level as a loss, wherein the measurement data is data obtained by measuring light transmitted through an object, the estimation data is data of a three-dimensional optical characteristic of the object estimated from the measurement data, the three-dimensional optical characteristic is a refractive index distribution or an absorptance distribution, in the estimation, the neural network is used, in the restoration, forward propagation operations are performed on the estimation data, and in the forward propagation operations, wavefronts passing through interior of the object estimated from the measurement data are sequentially obtained in a direction in which light travels.

9. The data processing method according to claim 8, wherein a difference between the measurement data and the restoration data is calculated, and the confidence level is calculated based on the difference.

10. The data processing method according to claim 8, wherein a correlation between the measurement data and the restoration data is calculated, and the confidence level is calculated based on the correlation.

11. The data processing method according to claim 8, wherein a sum of squares of a difference between the measurement data and the restoration data is calculated, and the confidence level is calculated based on a magnitude of the sum of squares of the difference.

12. The data processing method according to claim 8, comprising:

a first neural network; and a second neural network, wherein the first neural network is the neural network, the second neural network is a trained model, and the confidence level is calculated using the second neural network.

13. The data processing method according to claim 12, wherein the second neural network learns using a first training data set group and a second training data set group, the first training data set group includes a plurality of first training data sets, the first training data sets each include first data, first corrected data, and teaching data indicating true between true and false, the second training data set group includes a plurality of second training data sets, the second training data sets each include the first data, second corrected data, and teaching data indicating false between true and false, the first corrected data is data obtained by performing a correction process on the first data, the second corrected data is data obtained by performing a correction process on second data, the second data is different from the first data, and the first data and the second data are data obtained by measuring light transmitted through the object, or data generated by performing forward propagation operations on an object model that models a three-dimensional optical characteristic of the object.

14. The data processing method according to claim 8, further comprising a presentation step of presenting the confidence level.

15. A learning method for a neural network to calculate a confidence level of estimation data, wherein the confidence level of the estimation data is calculated based on measurement data and restoration data, the measurement data is data obtained by measuring light transmitted through an object, the estimation data is data of a three-dimensional optical characteristic of the object estimated from the measurement data, the three-dimensional optical characteristic is a refractive index distribution or an absorptance distribution, the restoration data is data generated by performing forward propagation operations on the estimation data, in the forward propagation operations, wavefronts passing through interior of the object estimated from the measurement data are sequentially obtained in a direction in which light travels, the learning method includes:

a first learning step of learning using a first training data set; and a second learning step of learning using a second training data set, the first learning step and the second learning step are repeatedly performed, the first training data set includes first data, first corrected data, and teaching data indicating true between true and false, the second training data set includes the first data, second corrected data, and the teaching data indicating false between true and false, the first corrected data is data obtained by performing a correction process on the first data, the second corrected data is data obtained by performing a correction process on second data, the second data is different from the first data, and the first data and the second data are data obtained by measuring light transmitted through the object, or data generated by performing forward propagation operations on an object model that models a three-dimensional optical characteristic of the object.

16. The learning method for a neural network according to claim 15, wherein the correction process performed on the first data and the correction process performed on the second data include at least one process among a deforming process, a rotating process, and a noise adding process.

* * * * *